(12) United States Patent
Shevgoor et al.

(10) Patent No.: US 10,761,844 B2
(45) Date of Patent: Sep. 1, 2020

(54) SYSTEMS AND METHODS TO PREDICT LOAD DATA VALUES

(71) Applicant: Intel Corporation, Santa Clara, CA (US)

(72) Inventors: Manjunath Shevgoor, San Jose, CA (US); Mark J. Dechene, Hillsboro, OR (US); Stanislav Shwartsman, Haifa (IL); Pavel I. Kryukov, Moscow (RU)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 16/023,407

(22) Filed: Jun. 29, 2018

(65) Prior Publication Data

US 2020/0004536 A1 Jan. 2, 2020

(51) Int. Cl.
*G06F 9/30* (2018.01)
*G06F 9/38* (2018.01)
*G06F 12/1027* (2016.01)

(52) U.S. Cl.
CPC ...... *G06F 9/30043* (2013.01); *G06F 9/30098* (2013.01); *G06F 9/30145* (2013.01); *G06F 9/3838* (2013.01); *G06F 9/3857* (2013.01); *G06F 9/3861* (2013.01); *G06F 9/3867* (2013.01); *G06F 12/1027* (2013.01)

(58) Field of Classification Search
CPC .................................................. G06F 9/30043
See application file for complete search history.

(56) References Cited

U.S. PATENT DOCUMENTS

| 6,438,673 B1 * | 8/2002 | Jourdan | G06F 9/383 711/213 |
| 7,788,473 B1 * | 8/2010 | Nelson | G06F 9/383 712/219 |
| 2014/0281384 A1 * | 9/2014 | Zeng | G06F 9/30043 712/42 |

OTHER PUBLICATIONS

Lipasti M.H., et al., "Value Locality and Load Value Prediction," ACM, Proceedings of the Seventh International Conference on Architectural Support for Programming Languages and Operating Systems (ASPLOS VII), Oct. 1996, pp. 138-147.

* cited by examiner

*Primary Examiner* — Farley Abad
(74) *Attorney, Agent, or Firm* — Nicholson De Vos Webster & Elliott LLP

(57) ABSTRACT

Disclosed embodiments relate to predicting load data. In one example, a processor a pipeline having stages ordered as fetch, decode, allocate, write back, and commit, a training table to store an address, predicted data, a state, and a count of instances of unchanged return data, and tracking circuitry to determine, during one or more of the allocate and decode stages, whether a training table entry has a first state and matches a fetched first load instruction, and, if so, using the data predicted by the entry during the execute stage, the tracking circuitry further to update the training table during or after the write back stage to set the state of the first load instruction in the training table to the first state when the count reaches a first threshold.

25 Claims, 19 Drawing Sheets

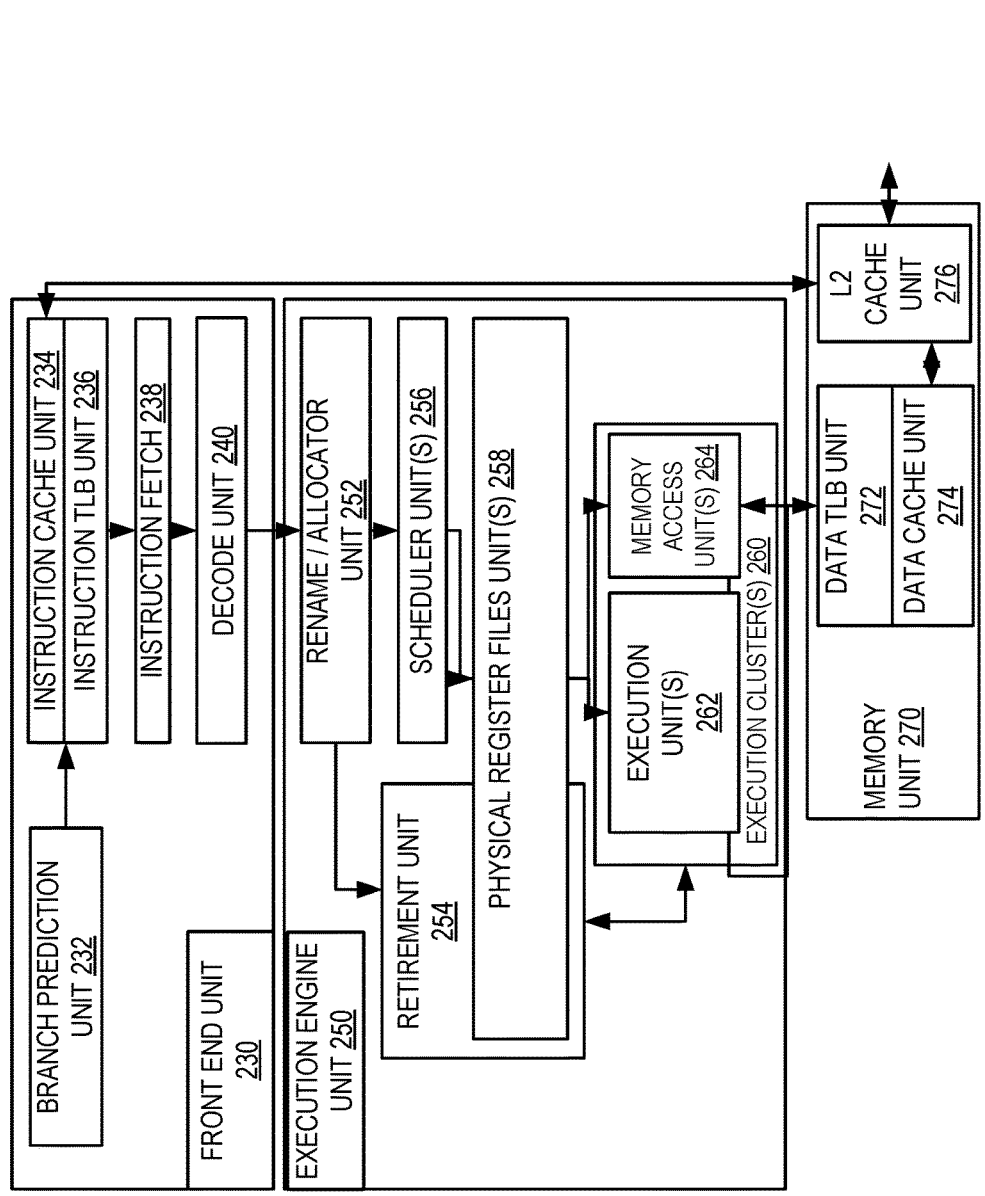

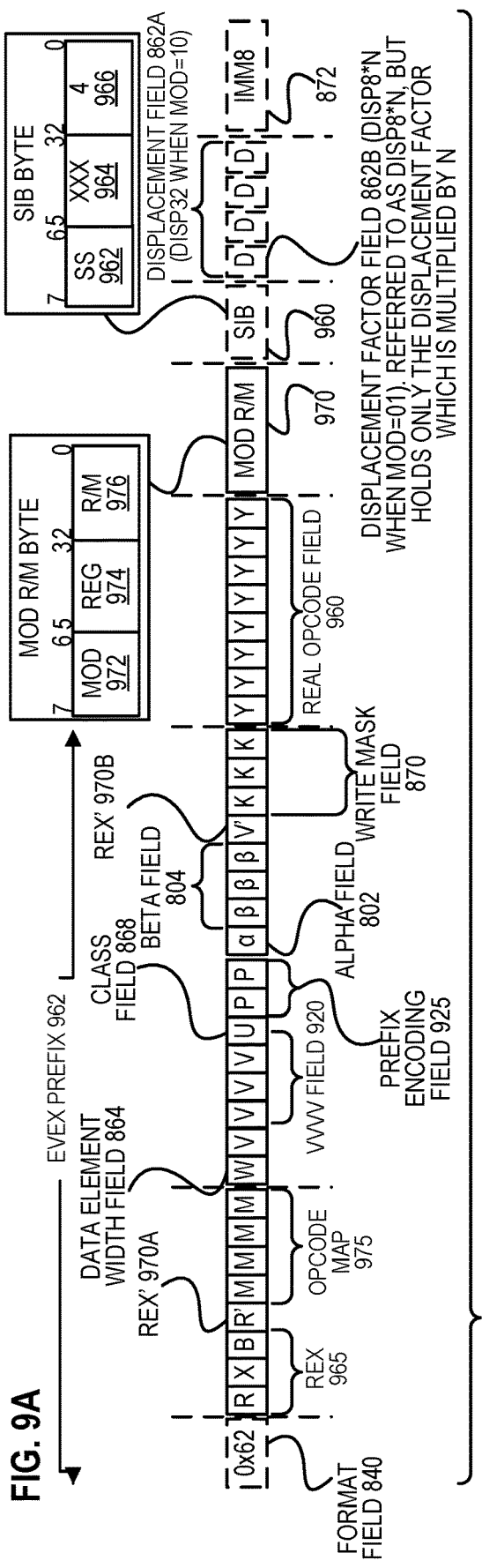
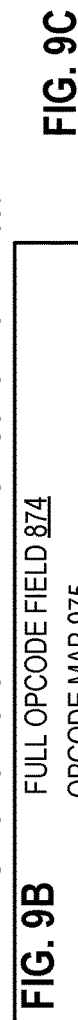
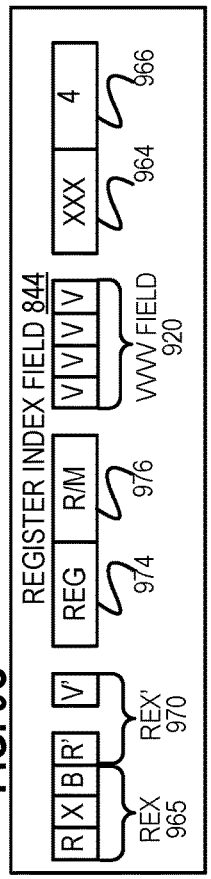
FIG. 9A
FIG. 9B
FIG. 9C

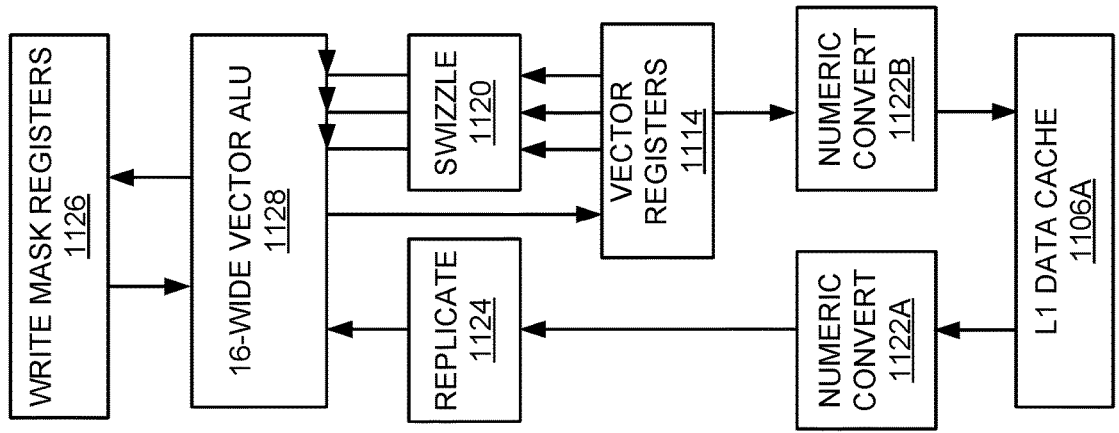
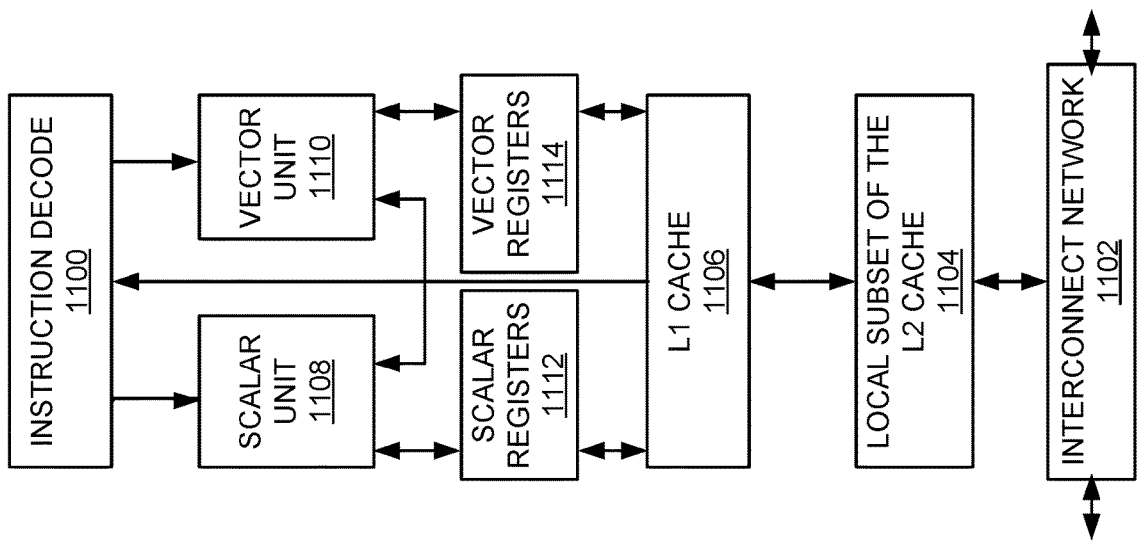

SYSTEMS AND METHODS TO PREDICT LOAD DATA VALUES

FIELD OF THE INVENTION

The field of invention relates generally to computer processor architecture, and, more specifically, to systems and methods for predicting load data.

BACKGROUND

Consumers continue to demand faster computers. In computing, memory latency is the time (the latency) between initiating a request for a byte or word in memory until it is retrieved by a processor. If the data are not in the processor's cache, it takes longer to obtain them, as the processor will have to communicate with the external memory cells. Latency is therefore a fundamental measure of the speed of memory: the less the latency, the faster the reading operation.

In some conventional processors, data read from the Level-1 data cache (L1) in response to a load instruction has a latency of at least 5 cycles. Additionally, the load instruction can only be executed after the address is calculated. The latency of address calculation depends on the resolution of prior dependencies. The resolution of prior dependencies can often take 10 seconds or more to complete.

Reducing memory read latency is an open challenge.

BRIEF DESCRIPTION OF THE DRAWINGS

The present invention is illustrated by way of example and not limitation in the figures of the accompanying drawings, in which like references indicate similar elements and in which:

FIG. 2A is a block diagram illustrating both an exemplary in-order pipeline and an exemplary register renaming, out-of-order issue/execution pipeline according to some embodiments;

FIG. 2B is a block diagram illustrating both an exemplary embodiment of an in-order architecture core and an exemplary register renaming, out-of-order issue/execution architecture core to be included in a processor according to some embodiments;

FIG. 8A is a block diagram illustrating a generic vector friendly instruction format and class A instruction templates thereof according to some embodiments of the invention;

FIG. 8B is a block diagram illustrating the generic vector friendly instruction format and class B instruction templates thereof according to some embodiments of the invention;

FIG. 9A is a block diagram illustrating an exemplary specific vector friendly instruction format according to some embodiments of the invention;

FIG. 9B is a block diagram illustrating the fields of the specific vector friendly instruction format that make up the full opcode field according to one embodiment;

FIG. 9C is a block diagram illustrating the fields of the specific vector friendly instruction format that make up the register index field according to one embodiment;

FIGS. 11A-B illustrate a block diagram of a more specific exemplary in-order core architecture, which core would be one of several logic blocks (including other cores of the same type and/or different types) in a chip;

FIG. 11A is a block diagram of a single processor core, along with its connection to the on-die interconnect network and with its local subset of the Level 2 (L2) cache, according to some embodiments;

FIG. 11B is an expanded view of part of the processor core in FIG. 11A according to some embodiments;

FIG. 13 shown a block diagram of a system in accordance with some embodiments;

FIG. 14 is a block diagram of a first more specific exemplary system in accordance with some embodiment;

FIG. 15 is a block diagram of a second more specific exemplary system in accordance with some embodiments;

FIG. 16 is a block diagram of a System-on-a-Chip (SoC) in accordance with some embodiments.

DETAILED DESCRIPTION OF THE EMBODIMENTS

Figure 1:
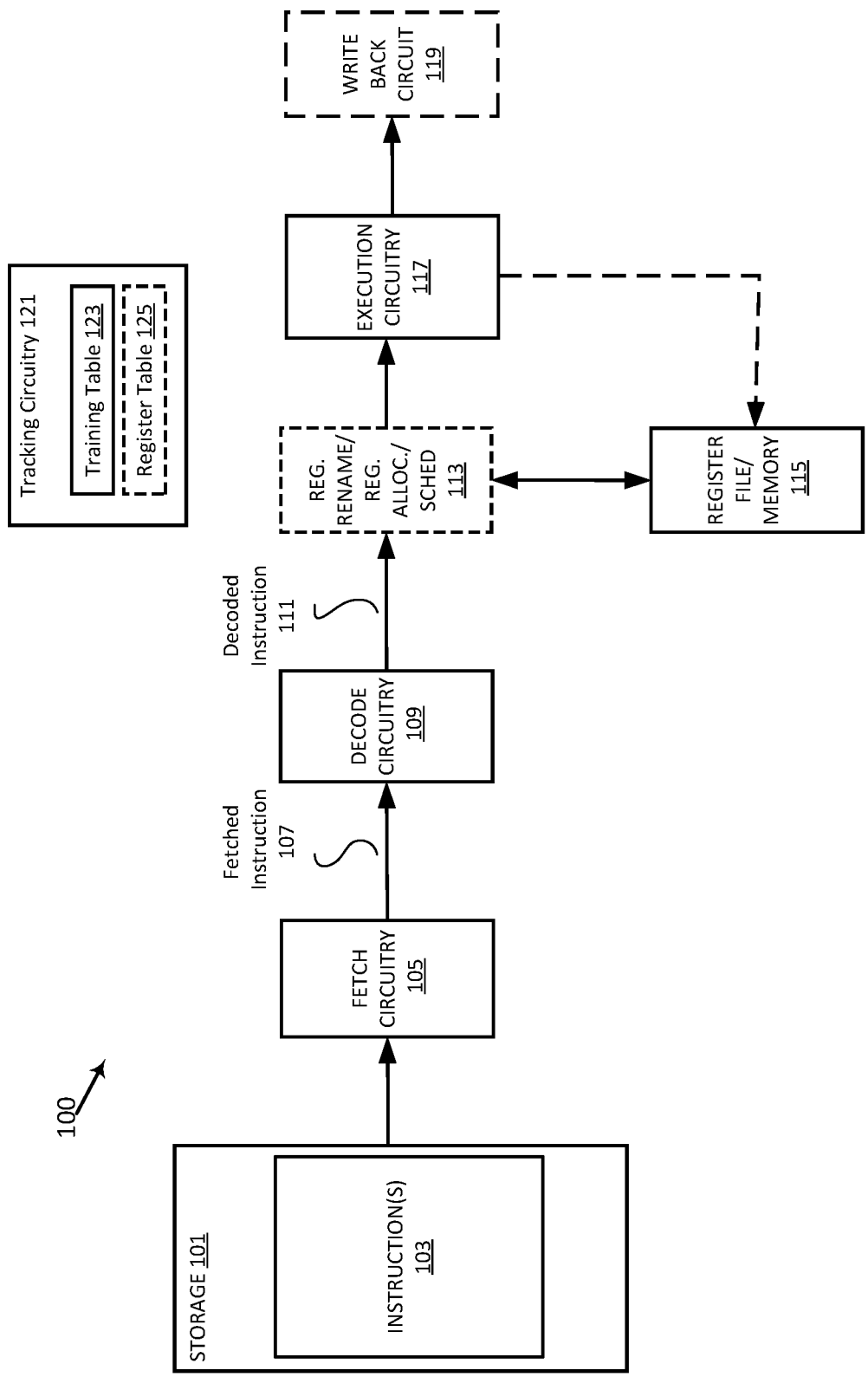
FIG. 1 is a block diagram illustrating processing components for executing instructions, according to an embodiment.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments use training and tracking circuitry to identify load instructions with frequently-repeating results, and to predict that subsequent instances of such loads will retrieve the same data. The predicted values are used by instructions that are consumers of the load instructions, in the consumers execute pipeline stage. For example, the predicted value is retrieved at the allocate stage of a consumer load, and it is used at the execute stage of an add instruction. The predicted data, having been locally stored in a register, is retrieved early in the processor's execution pipeline—during the allocate stage—rather than having to wait for the load data to arrive. The predicted data is advantageously used in the pipeline earlier than would be possible without the disclosed optimizations, but the execution results are not committed until correctness of the predicted load data is confirmed.

Furthermore, load instructions are stored in a training table and are indexed by their linear instruction pointers, such that subsequent instances of each load can find the load in the training table without having to calculate a load address, thus breaking dependencies between the load and the sources needed to calculate its address.

Circuitry to Implement Disclosed Load-Data Prediction Optimizations

Additionally, some embodiments retain previously loaded data in a register file (RF), such that subsequently using any of the stored data as predicted data is accomplished by just manipulating pointers, thus eliminating the need to actually move the data.

Some embodiments implement the above optimizations using two structures: the training table, which is used to track loads to classify them as static and not static (described below and with respect to FIG. 4), and the register table which tracks the logical register assigned to each load (described below and with respect to FIG. 5).

Training Table

Some disclosed embodiments attempt to reduce memory latency by predicting the values of loads using only the linear instruction pointer (LIP) of the load and avoid L1 read latency as well as cutting dependencies from the load to the sources needed to generate its address.

According to disclosed embodiments, every load is given an entry in the training table (TT). The TT is a set-associative structure that is indexed by a part of the LIP of the load. A different part of the LIP of the load is then used as a tag to match the correct way of the TT. When a load is allocated an entry into the TT, it writes its data into the TT when it receives the data from the L1. Subsequent instances of the load then compare the new data to the data that is already in the TT. If a predetermined number of instances do not change the data, then the load is deemed "STATIC."

In particular, some disclosed embodiments take advantage of the tendency of some loads to frequently return the same result. Software and code sometimes tend to load the same resulting data over and over. Disclosed embodiments therefore use a training table to track load instruction addresses (i.e. the address of the instruction for the load, not the address from which the load retrieves data), their returned data, and a state indicating whether they are static. As used herein, a "static" load is one who retrieves the same data more than a first threshold number of times.

Register Table

Once a load is classified as STATIC, it is assigned to one of a fixed number of logical registers called SLT registers. SLT registers in some embodiments identify an architectural register in a register file, for example, a register file as illustrated and described with respect to FIG. 10. In other embodiments, SLT registers identify registers in a different set of registers. SLT registers are assigned to a register table, described below. All that is needed is a logical register namespace. The first instance following a load being classified static is sometimes referred to as "SLT Acquire." This is the load that gets an SLT register assigned to it. In addition to writing back to the destination register of the load instruction, it also writes to the SLT register.

By assigning the SLT register the same physical register ID as the destination of the load, it is possible to Move Eliminate writing to the SLT register. Instances of the load following the SLT Acquire are called "SLT Loads." Since the predicted value is already in the Physical Register File (PRF), the SLT Load can record the predicted value's register as its destination physical register, which allows consumers to bypass the SLT Load and use the predicted value directly. The SLT Load issues a load-check to confirm that the predicted value is correct. This load-check is off the critical path and has no dependencies. If the prediction is wrong, the dependents of the load instruction are killed and the load needs to be re-issued.

Predicting the Load Data Value

To determine whether a load is a candidate for prediction, the load is tracked in a training table for a significant amount of time. Loads that are static may get evicted by loads that are not static leading to lost opportunities, so some embodiments prevent thrashing by not immediately evicting a static load from the training table, but only after a threshold number of eviction scenarios have arisen.

Disclosed embodiments are expected to improve a processor's memory performance by reducing the impact of serial dependency between instructions. Serial dependency is a problem that is sometimes immune to traditional width and depth scaling techniques that have been used by core architects. Serial dependencies are created when one instruction produces a result that is used by a subsequent instruction. In some instances, there may be long chains of instructions where each instruction depends on the result of a previous instruction, and the performance of the program is limited by the latency to execute all of the instructions in the chain one after another. According to some disclosed embodiments, performance of serially dependent loads is improved by allowing the dependent instructions of a load to execute before the load itself.

Many load instructions repeatedly read the same value from memory. Disclosed embodiments attempt to improve a processor's memory load performance by allowing loads subsequent to the first one to use a predicted value as tracked in the training table, rather than to have to wait for the actual data to be returned via a memory read.

Using a Limited-Size Training Table Efficiently

Because the training table is to track every load instruction, left unchecked its size can become larger and larger, verging on problematic. Disclosed embodiments use two techniques to make efficient use of training tables having a limited size.

Blacklisting: First, using blacklisting, loads that are not static-loads that change the values they read are tracked in a blacklist. In some embodiments, a blacklist is implemented as a Bloom filter. (As used herein, a Bloom filter is a space-efficient probabilistic data structure used to test whether an element is a member of a set. False positive matches are possible, but false negatives are not—in other words, querying the Bloom filter returns either "possibly in set" or "definitely not in set.") When a load is a hit in the Bloom filter, it is no longer a candidate for prediction and is therefore not tracked in or added to the training table.

Lazy Eviction: Once a load is being tracked, it is not evicted until a certain threshold number of loads have tried to evict the load. Only once the number of eviction requests crosses a predetermined threshold, is a load evicted from the training table.

Move Elimination

In some embodiments, previously-loaded data values returned from STATIC loads are stored in a predictor structure. In some embodiments, a training table stores the actual data during training. The Register Table is a table that holds pointers to SLT registers in the processor register file.

Using Move Elimination (ME), disclosed embodiments avoid moving data values from the predictor to the Physical Register File (PRF) every time the load is executed. Using ME, register name pointers management replaces copying data values from one register into another. By retaining the value in the processor register file, successive loads are able to re-use the same processor register file entry to get the data.

In operation, the value stored in the predictor structure is moved to the PRF during SLT Acquire, as described above. This move need only occur once. Subsequent instances of the load can then Move Eliminate the SLT register to the destination of the load register.

According to some embodiments, the data is moved only once from a training table into the processor register file; advantageously, no more movement is necessary.

Some disclosed embodiments use a register table to keep track of where the latest load data corresponding to loads in the training table reside.

Freeing Up SLT Registers

As explained above, once a load is classified as STATIC, it is assigned to one of a fixed number of logical registers called SLT registers. There are two mechanisms to free these SLT registers. First, whenever a load is incorrectly predicted, the register used by that load is freed. Secondly, registers that have not been used in a predetermined epoch of time can be marked for reclamation.

FIG. 1 is a block diagram illustrating processing components for executing instructions, according to some embodiments. As illustrated, storage 101 stores instruction(s) 103 to be executed.

In operation, instruction(s) 103 is fetched from storage 101 by fetch circuitry 105. The fetched instruction 107 is decoded by decode circuitry 109. The instruction format is further illustrated and described with respect to 8A-B, and 9A-D. Decode circuitry 109 decodes the fetched instruction 107 into one or more operations. In some embodiments, this decoding includes generating a plurality of micro-operations to be performed by execution circuitry (such as execution circuitry 117). The decode circuitry 109 also decodes instruction suffixes and prefixes (if used). Execution circuitry 117 is further described and illustrated below, at least with respect to FIGS. 3-7, 2A-B and 11A-B.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded instruction 111 for execution on execution circuitry 117 out of an instruction pool (e.g., using a reservation station in some embodiments).

Registers (register file) and/or memory 115 store data as operands of decoded instruction 111 to be operated on by execution circuitry 117. Exemplary register types include writemask registers, packed data registers, general purpose registers, and floating-point registers, as further described and illustrated below, at least with respect to FIG. 10.

Also shown is tracking circuitry 121, including training table 123 to store, for each of a plurality of load instructions, an address, predicted data, a state, and a count of instances of unchanged return data. The training table 123 is further illustrated and described with respect to FIG. 4. In some embodiments, tracking circuitry 121 further includes register table 125 to store a pointer to an SLT register in a file, the pointer to be used to fetch the contents of the SLT register for use as load data for subsequent instances of a load instruction. Register table 125 is further illustrated and described with respect to FIG. 5. In some embodiments, not shown, tracking circuitry 121 is incorporated in, and is part of, execution circuitry 117.

In some embodiments, write back circuit 119 commits the result of the execution of the decoded instruction 111. Write back circuit 119 is optional, as indicated by its dashed border, insofar as write back may occur at a different time, or not at all. Execution circuitry 117 and system 100 are further illustrated and described with respect to FIGS. 3-7, 2A-B and 11A-B.

FIG. 2A is a block diagram illustrating both an exemplary in-order pipeline and an exemplary register renaming, out-of-order issue/execution pipeline according to some embodiments of the invention. FIG. 2B is a block diagram illustrating both an exemplary embodiment of an in-order architecture core and an exemplary register renaming, out-of-order issue/execution architecture core to be included in a processor according to some embodiments of the invention. The solid lined boxes in FIGS. 2A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 2A, a processor pipeline 200 includes a fetch stage 202, a length-decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224.

FIG. 2B shows processor core 290 including a front-end unit 230 coupled to an execution engine unit 250, and both are coupled to a memory unit 270. The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, coprocessor core, general purpose computing graphics processing unit (GPGPU) core, graphics core, or the like.

The front-end unit 230 includes a branch prediction unit 232 coupled to an instruction cache unit 234, which is coupled to an instruction translation lookaside buffer (TLB) 236, which is coupled to an instruction fetch unit 238, which is coupled to a decode unit 240. The decode unit 240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 290 includes a microcode ROM or other medium that stores microcode for certain macroinstructions (e.g., in decode unit 240 or otherwise within the front-end unit 230). The decode unit 240 is coupled to a rename/allocator unit 252 in the execution engine unit 250.

The execution engine unit 250 includes the rename/allocator unit 252 coupled to a retirement unit 254 and a set of one or more scheduler unit(s) 256. The scheduler unit(s) 256 represents any number of different schedulers, including reservations stations, central instruction window, etc. The scheduler unit(s) 256 is coupled to the physical register file(s) unit(s) 258. Each of the physical register file(s) units 258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 258 comprises a vector registers unit, a write mask registers unit, and a scalar registers unit. These register units may provide architectural vector registers, vector mask registers, and general-purpose registers. The physical register file(s) unit(s) 258 is overlapped by the retirement unit 254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 254 and the physical register file(s) unit(s) 258 are coupled to the execution cluster(s) 260. The execution cluster(s) 260 includes a set of one or more execution units 262 and a set of one or more memory access units 264. The execution units 262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 256, physical register file(s) unit(s) 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 264). It should also be understood that where separate pipelines are used, one or more of these pipelines may be out-of-order issue/execution and the rest in-order.

The set of memory access units 264 is coupled to the memory unit 270, which includes a data TLB unit 272 coupled to a data cache unit 274 coupled to a level 2 (L2) cache unit 276. In one exemplary embodiment, the memory access units 264 may include a load unit, a store address unit, and a store data unit, each of which is coupled to the data TLB unit 272 in the memory unit 270. The instruction cache unit 234 is further coupled to a level 2 (L2) cache unit 276 in the memory unit 270. The L2 cache unit 276 is coupled to one or more other levels of cache and eventually to a main memory.

By way of example, the exemplary register renaming, out-of-order issue/execution core architecture may implement the pipeline 200 as follows: 1) the instruction fetch 238 performs the fetch and length decoding stages 202 and 204; 2) the decode unit 240 performs the decode stage 206; 3) the rename/allocator unit 252 performs the allocation stage 208 and renaming stage 210; 4) the scheduler unit(s) 256 performs the schedule stage 212; 5) the physical register file(s) unit(s) 258 and the memory unit 270 perform the register read/memory read stage 214; the execution cluster 260 perform the execute stage 216; 6) the memory unit 270 and the physical register file(s) unit(s) 258 perform the write back/memory write stage 218; 7) various units may be involved in the exception handling stage 222; and 8) the retirement unit 254 and the physical register file(s) unit(s) 258 perform the commit stage 224.

The core 290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 234/274 and a shared L2 cache unit 276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 3:
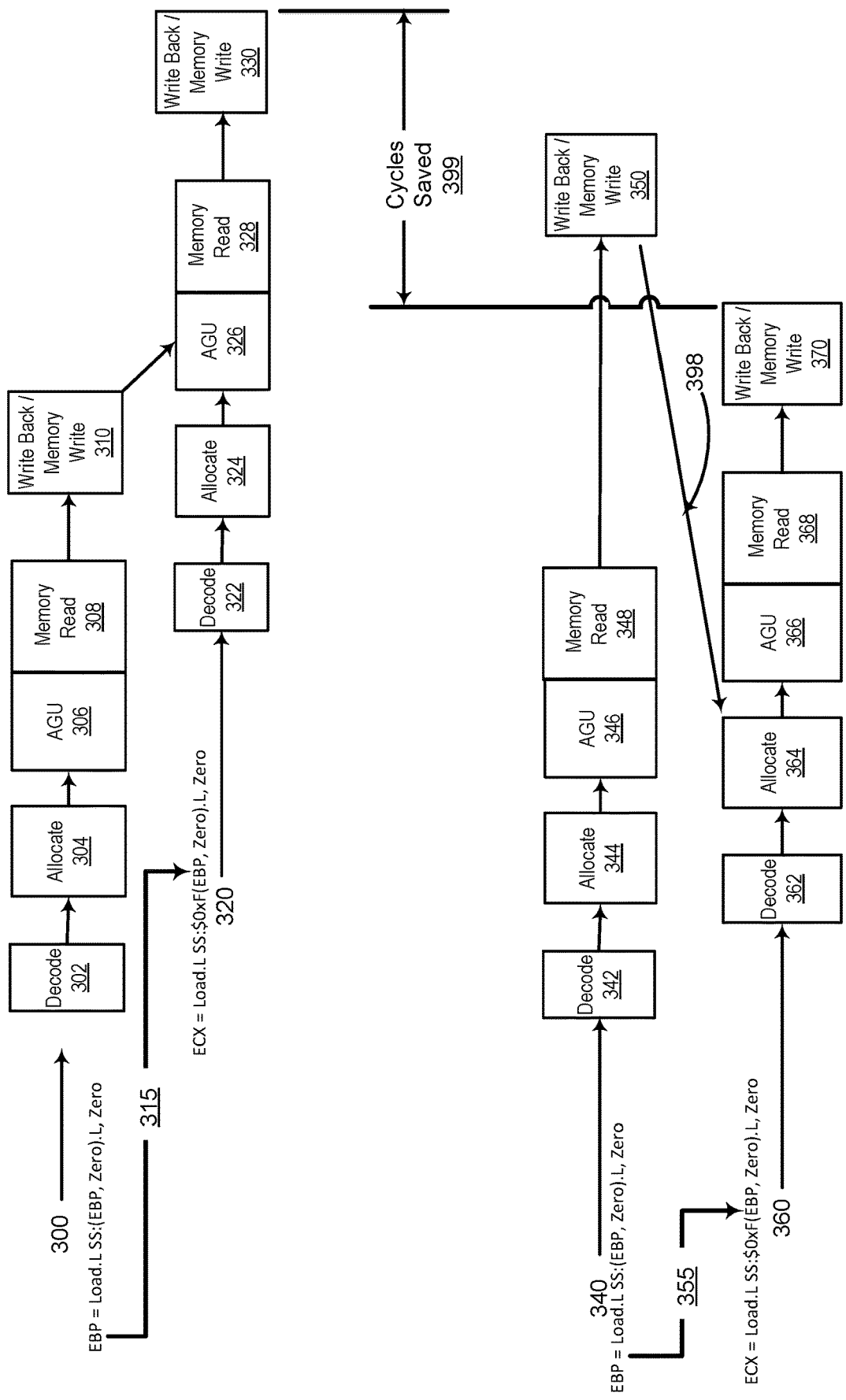
FIG. 3 shows pipeline flow diagrams to illustrate a method of predicting load data, according to some embodiments.

FIG. 3 shows pipeline flow diagrams to illustrate a method of predicting load data, according to some embodiments. As shown, the load 320 writing to ECX is dependent on the load 300 writing to EBP (a logical architectural register of a processor). Load 300 traverses pipeline stages at decode 302, allocate 304, AGU 306, memory read 308, and write back/memory write 310. In some embodiments, loads are complex operations and take many cycles to "Execute". The first stage of this is AGU, or Address Generation Unit. The AGU performs operations similar to what is done, for example in Executing an ADD operation, but the result is an address to get data from, and not the final result of the load. Of course, a processor pipeline includes many more states, for example as illustrated and described with respect to FIGS. 2A-B, but only a relevant subset of stages is shown here in order to simplify the discussion. Load 320 traverses pipeline stages at decode 322, allocate 324, AGU 326, memory read 328, and write back/memory write 332. However, since the optimizations of disclosed embodiments are not used, and due to the dependency 315, AGU 326 is stalled until after data is forwarded to it from 310 Write Back/Memory Write of load 320.

As shown, however, Instructions 340 and 360 have been optimized according to disclosed embodiments. The flows of instructions 340 and 360 take place after training has been completed and the load to register EBP having been identified as STATIC in the past. Load 340 traverses pipeline stages at decode 342, allocate 344, AGU 346, memory read 348, and write back/memory write 350. Load 360 traverses pipeline stages at decode 362 and allocate 364. However, load 360, having been optimized in the past according to some embodiments herein, has severed the dependency 355.

The arrow labeled as 398 traversing write back 350 to allocate 364 is not meant to illustrate a data flow, but rather intended to illustrate that the serial dependency (first this, then that) has been broken and the dependent instruction 360, which get its load data at allocate 364, effectively executes before the producer instruction 340. In other words, arrow 398 is to illustrate that even though there is a data dependency 355, the prediction has obviated the need to wait for 350.

The optimization here is shown as eliminating the additional latency incurred in waiting for dependency 355 to resolve. Instead, the load of register EBP was deemed in the past to be a STATIC load, and the data last retrieved for EBP was stored in a training table (not shown), and was retrieved as a predicted value at allocate 364. Processing of instruction 360 then proceeds using the predicted data value through AGU 366, memory read 368, and write back/memory write 370. As illustrated, the writeback of instruction 360 occurs some number of cycles, labeled as 399, sooner than it would have without the optimization.

Figure 4:
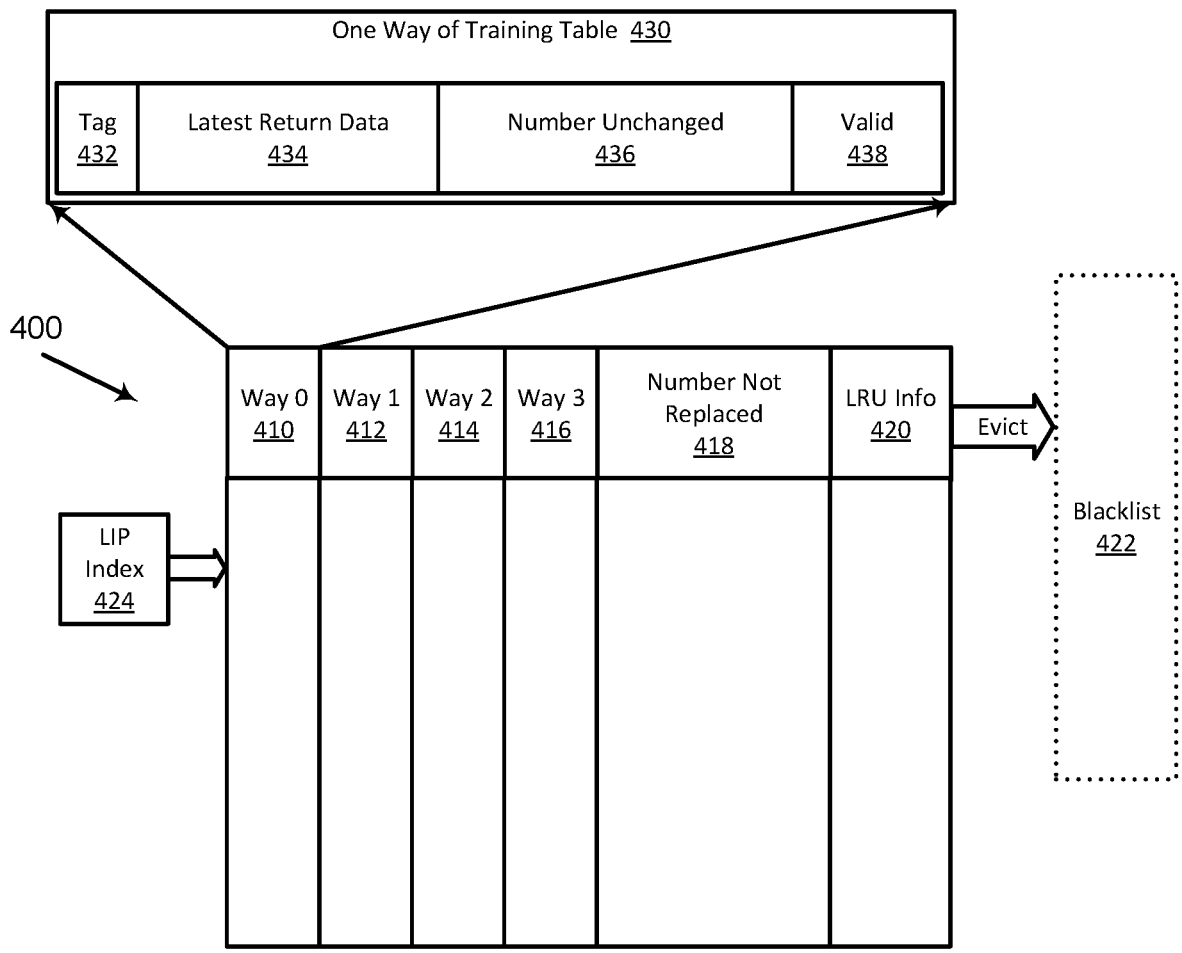
FIG. 4 is a block diagram illustrating a training table, according to some embodiments.

FIG. 4 is a block diagram illustrating a training table, according to some embodiments. Training table (TT) 400 is a memory structure used to determine the nature of loads, and which could be set-associative, direct-mapped, or fully associative. As shown, TT 400 is a set-associative memory structure having four ways: way 0 410, way 1 412, way 2 414, and way 3 416, and also including number not replaced 418 and LRU (Least Recently Used) info 420. Here, TT 400 is indexed by some low-order bits of LIP (Linear Instruction Pointer) in LIP Index 424, with the remaining LIP bits used as the tag.

Also shown is one way of training table 430, which includes tag 432, latest return data 434, number unchanged 436, and valid 438. According to some embodiments, every load is allocated an entry in the TT. Every instance of the load where the value read from the L1 remains unchanged increments the Number Unchanged 436 field. This value saturates at a predetermined threshold, at which point the load is deemed STATIC and will serve as a predicted load value for subsequent instances of the load. If a load changes its value before reaching the threshold, it is deemed NON-STATIC and is evicted from the TT.

As described above, training table 400 tracks each load that is executed in the pipeline. Table 6, below, illustrates a life cycle of load instructions, according to some embodiments. In operation, training table 400 is looked up at allocate stage, decode stage, or partly during both stages, to determine whether a load is a STATIC load (e.g., operations 606, 616, 618, and 622 of FIG. 6 operating alone or together, contribute to determining whether a load is or should continue to be deemed STATIC). Training table 400 in some embodiments is written or updated after a STATIC load has been identified, for example during a write back stage or thereafter. In some embodiments, training table 400 is updated after the STATIC load instruction retires or is committed.

Blacklist

Loads that change their value before reaching the threshold are evicted from the TT and are then assigned an entry in the blacklist 422, which maintains a list of all loads that change their values often such that they are not viable candidates for prediction.

In some embodiments, the blacklist 422 is implemented as a Bloom filter, but it may also be implemented in other ways. If a load is a hit in the blacklist, it is not tracked in the TT. The blacklist is periodically cleared. It may be cleared after regular intervals in time, or once the occupancy has reached a predetermined threshold.

The blacklist, as indicated by its dashed outline, is optional, insofar as it might be omitted, in which case TT entries are evicted immediately. But the blacklist is an optimization that allows some disclosed embodiments to make do with a relatively smaller memory structure.

Lazy Eviction

In some embodiments, if all ways in a set of the TT are occupied, and a new load is mapped to the same set, the new load does not immediately get to evict the loads already present. Rather, in some embodiments, it takes each load a predetermined number of instances to be deemed STATIC, or to be blacklisted. Hence, each set counts the number of times an eviction request has been made to the set, and this is tracked by Number Not Replaced 418 field in each set. (Any time there is an eviction, the 'Number Not Replaced' 418 is reset.) Only when this counter reaches a predetermined threshold is an entry evicted from the set.

This lazy eviction scheme also guards against frequent loads being evicted by infrequent loads, potentially leading to thrashing. In some embodiments, when a way has to be evicted, the LRU (least recently used) way is evicted. Some embodiments use other metrics, such as the number not replaced 418, may also be used to determine which entry to evict. In such embodiments, the number not replaced 418 tracks the number of times evictions have been denied for a way; ways with the highest number of denials being selected for eviction. In some embodiments, the number not replaced 418 tracks the number of times evictions have been denied for the entire TT instead of for each set in the TT.

In some embodiments, if one of the loads being tracked in the TT changes its value before it reaches the 'Number Unchanged' threshold, it is evicted anyway, thus clearing the way for a new load.

Figure 5:
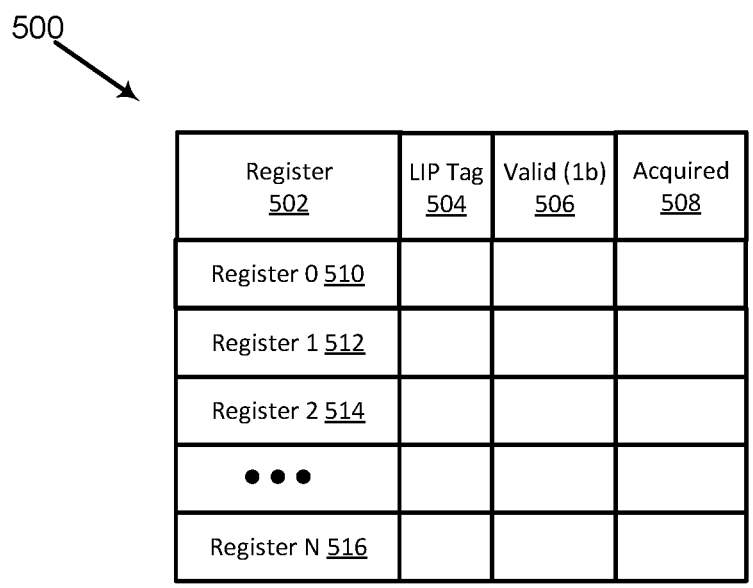
FIG. 5 is a block diagram illustrating a register table, according to some embodiments.

FIG. 5 is a block diagram illustrating a register table, according to some embodiments. FIG. 5. As shown, register table 500 includes columns for register 502, LIP Tag 504 (Linear Instruction Pointer tag), Valid (1 bit) 506, and Acquired 508. Register table 500 also includes rows for register 0 510, register 1 512, register 2 514, and register N 516.

In operation, register table 500 tracks which logical register has been assigned to each load. Register table 500 is looked up at allocate pipe stage, decode pipe stage, or partly during both stages, when it is determined that a load is a STATIC load. Register table 500 in some embodiments is written or updated after a register holding return data for a STATIC load has been identified, for example during a write back pipe stage or thereafter. In other words, in some embodiments, when the training table is updated, if a load is newly deemed static, it is assigned a register and identified in the register table 500. The tracking circuitry then knows which load is assigned to which register. In some embodiments, register table 500 is updated after the STATIC load instruction retires or is committed. Register table 500 is indexed using the some of the low-order bits of the LIP of the load, the remaining bits being stored as LIP Tag 504.

Register table 500 also tracks whether the load has already been acquired. This acquire bit 508 is then used by the rename logic in the OOO (Out of Order) block during the rename stage of the pipeline.

As explained above, experiments have also shown that many loads in a program load the same data value. Therefore, the same register can be assigned to all loads that read the same data from the L1. This can be accomplished by tracking the data in register table 500.

Figure 6:
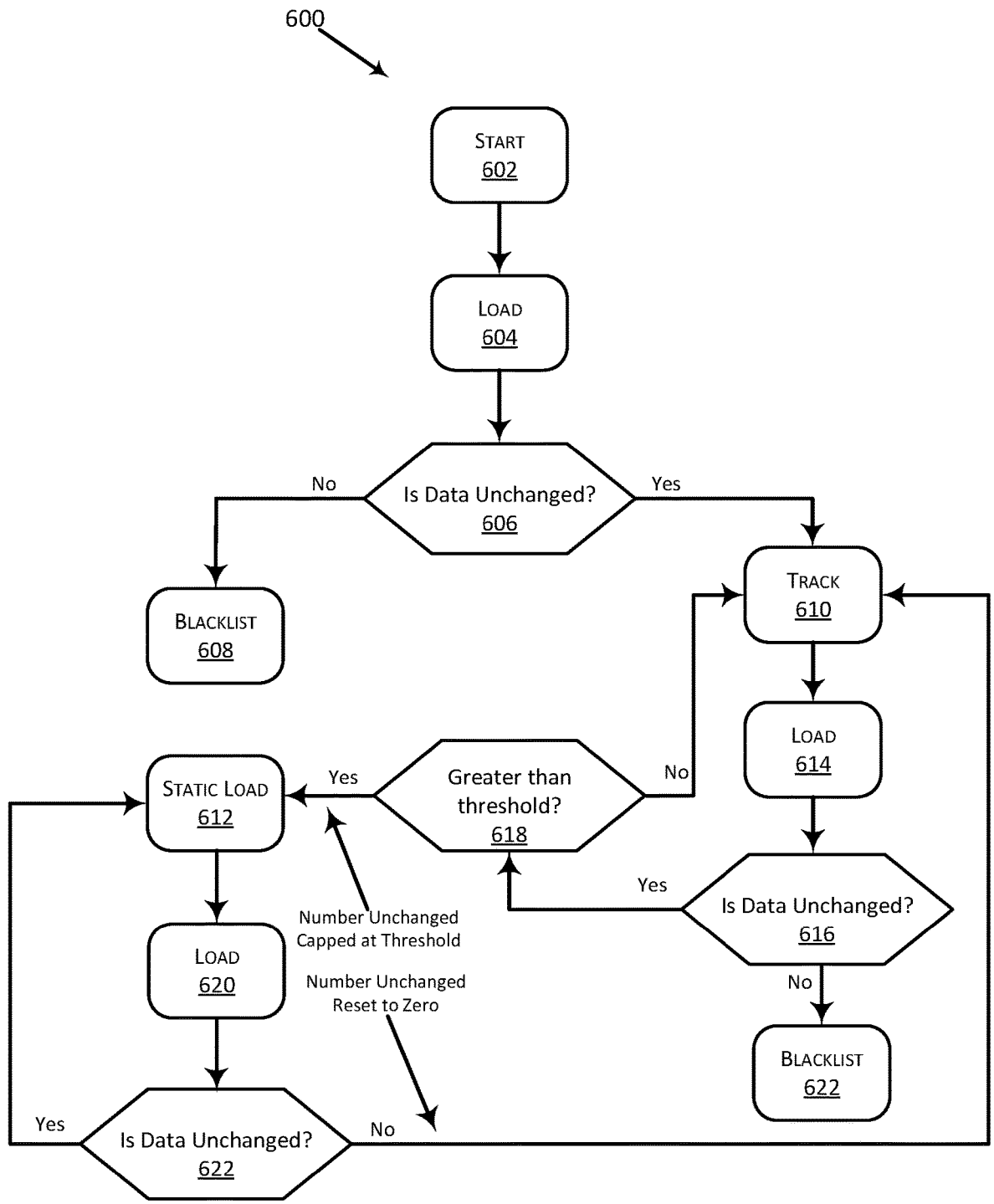
FIG. 6 is a block flow diagram illustrating a method of predicting load data, according to some embodiments.

FIG. 6 is a block flow diagram illustrating a method of predicting load data to be performed by a processor including a pipeline having fetch, decode, allocate, execute, memory read, and commit stages, the processor further including a training table and a register table, as described in various disclosed embodiments with respect to FIGS. 3-5 and 7.

As shown, a processor begins executing flow 600 at start 602. At 604, the processor executes a load. At 606, the processor determines whether the resulting load data is unchanged. If the data has changed, the processor adds the load to the blacklist at 608 and the flow ends. In other words, the load is not a good candidate to be considered STATIC as described herein.

But if the processor determines at 606 that the load data is the same, at 610 it tracks the load (i.e., by adding it to a training table or, if the load was already present in the training table, incrementing the number unchanged (e.g., number unchanged 436 of FIG. 4)). At 614, the processor executes the load, presumably a later instance thereof. At 616, the processor determines whether the load data is unchanged. If the data has changed, the processor adds the load to the blacklist at 622 and the flow ends.

But if the processor determines at 616 that the load data is the same, it increments the number unchanged and determines at 618 whether the number unchanged is greater than a threshold. If not, the processor updates the number unchanged in the training table at 610 and waits for a subsequent instance of the load.

But if the processor determines at 618 that the number unchanged is greater than a threshold, at 612 it deems the load as a STATIC load and uses the stored last loaded value as a predicted load value for subsequent instances of the load. For example, at 620, the processor receives a subsequent instance of the load and services it with previously stored load data as predicted data for the load. At 622, the processor determines whether the load data has changed, and if the data is the same, returns to 612 to deem the load as STATIC and await a subsequent instance of the load.

But if the processor determines at 622 that the load data has changed, it returns to 610 to reset the number unchanged to zero and begin tracking again. After returning to 610, the load will have to receive the same data for at least a threshold number of instances before it is deemed STATIC again. In some embodiments, not shown, the load is evicted from the training table when its data is determined to have changed at 622.

Figure 7:
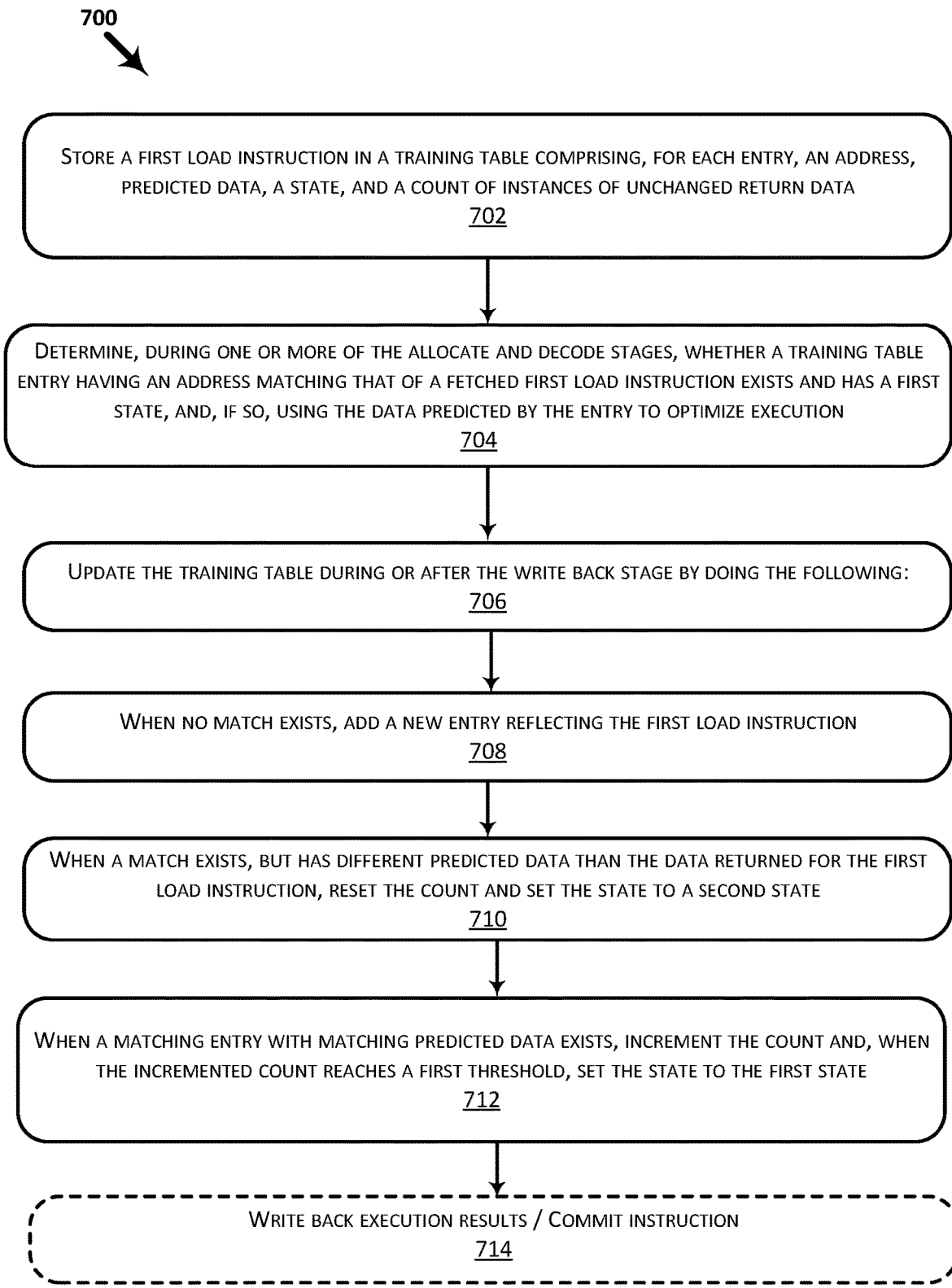
FIG. 7 is a block flow diagram illustrating a processor predicting load data, according to some embodiments.

FIG. 7 is a block flow diagram illustrating a method of predicting load data to be performed by a processor including a pipeline having stages ordered as fetch, allocate, decode, write back, and commit, the processor further including a training table, a register table, and tracking circuitry as described in various disclosed embodiments with respect to FIGS. 3-6 and 11A-B.

As shown, at 702, the processor is to store a first load instruction in a training table comprising, for each entry, an address, predicted data, a state, and a count of instances of unchanged return data a first load instruction in a training table comprising, for each entry, an address, predicted data, a state, and a count of instances of unchanged return data.

At 704, the processor is to determine, during one or more of the allocate and decode stages, whether a training table entry having an address matching that of a fetched first load instruction exists and has a first state, and, if so, using the data predicted to optimize execution.

At 706, the processor is to update the training table during or after the write back stage by doing the following. At 708, when no match exists, adding a new entry reflecting the first load instruction. At 710, when a match exists, but has different predicted data than the data returned for the first load instruction, reset the count and set the state to a second state. At 712, when a matching entry with matching predicted data exists, increment the count and, when the incremented count reaches a first threshold, set the state to the first state.

In some embodiments, when the incremented count reaches the first threshold at operation 712, the processor implements a move elimination operation by storing the predicted data from the training table entry to a SLT register in a register file, and using a pointer to the SLT register as load data for subsequent instances of the first load instruction. This is tantamount to assigning an SLT register, and happens only after threshold number of loads have been unchanged.

At 714, in some embodiments, the processor is to write back execution results/commit instruction. Operation 710 is optional, as indicated by its dashed border, insofar as the write back may occur at a different time, or not at all.

FURTHER EXAMPLES

Example 1 provides an exemplary processor including: fetch and decode circuitry to fetch and decode load instructions, a pipeline having stages ordered as fetch, decode, allocate, write back, and commit; a training table to store, for each of a plurality of load instructions, an address, predicted data, a state, and a count of instances of unchanged return data, and tracking circuitry to determine, during one or more of the allocate and decode stages, whether a training table entry has a first state and matches a fetched first load instruction, and, if so, using the data predicted by the entry during the execute stage, the tracking circuitry further to update the training table during or after the write back stage by: when no match exists, adding a new entry reflecting the first load instruction, when a match exists, but has different predicted data than the data returned for the first load instruction, reset the count and set the state to a second state, and when a matching entry with matching predicted data exists, increment the count and, when the incremented count reaches a first threshold, set the state to the first state.

Example 2 includes the substance of the exemplary processor of Example 1, wherein, when the predicted data is used to optimize execution during the execute stage, the processor is further to await receipt of actual load data for the first load instruction, confirm whether the actual load data matches the predicted data, when a match is confirmed, accept results of executing the first load instruction and cause the first load instruction to be committed during the commit stage, and, otherwise, discard the optimized execution results and cause the first load instruction to be executed again.

Example 3 includes the substance of the exemplary processor of Example 1, wherein each training table entry is further to store an optimization opportunity expiration timeout count, and the processor, when adding a new entry to the training table, is further to set the optimization opportunity expiration timeout count to a fixed number of clocks ahead of a current clock, the processor further to compare the optimization opportunity expiration timeout to the current clock when determining which of one or more entries to evict from the training table.

Example 4 includes the substance of the exemplary processor of Example 1, wherein the processor, when setting the state to the first state, uses a move elimination operation by storing the predicted data from the training table entry to a SLT register in a register file, and using a pointer to the SLT register as load data for subsequent instances of the first load instruction.

Example 5 includes the substance of the exemplary processor of Example 1, wherein adding the new entry reflecting the first load instruction includes setting the address stored in the new entry to a linear address of the first load instruction, setting the predicated data stored in the new entry to the data returned for the first load instruction, setting the state to the second state, and resetting the count of instances with unchanged data.

Example 6 includes the substance of the exemplary processor of Example 1, wherein the training table is stored in memory being distinct from the processor register file.

Example 7 includes the substance of the exemplary processor of Example 1, wherein the training table includes one of a set-associative memory structure, a fully associative memory structure, and a direct-mapped memory structure.

Example 8 includes the substance of the exemplary processor of Example 1, wherein the processor is further to evict a mispredicted entry from the training table, the mispredicted entry being one whose address matches that of the first load instruction, but whose predicted data differs from data returned for the first load instruction.

Example 9 includes the substance of the exemplary processor of Example 8, wherein the processor is further to add each mispredicted load to a Bloom filter, and to use the Bloom filter when selecting a training table entry to evict by determining whether a load-to-evict is either possibly in the set or definitely not in the set.

Example 10 includes the substance of the exemplary processor of Example 8, wherein the processor is to implement a lazy eviction scheme by storing, for each of the mispredicted load instructions, a mismatch count to track how many times the mispredicted load has been mispredicted, and to hold off evicting the mispredicted load until its mismatch count surpasses a second threshold.

Example 11 provides an exemplary method of processing load instructions by a processor having a pipeline including stages ordered as fetch, allocate, decode, write back, and commit, the method including: storing a first load instruction in a training table including, for each entry, an address, predicted data, a state, and a count of instances of unchanged return data; determining, during one or more of the allocate and decode stages, whether a training table entry having a stored address matching that of a fetched first load instruction exists and has a first state, and, if so, using the data predicted by the entry to optimize execution, and updating the training table during or after the write back stage to: when no match exists, adding a new entry reflecting the first load instruction, when a match exists, but has different predicted data than the data returned for the first load instruction, reset the count and set the state to a second state, and when a matching entry with matching predicted data exists, increment the count and, when the incremented count reaches a first threshold, set the state to the first state.

Example 12 includes the substance of the exemplary method of Example 11, wherein, when the predicted data is used to optimize execution during the execute stage, the processor is further to await receipt of actual load data for the first load instruction, confirm whether the actual load data matches the predicted data, when a match is confirmed, accept results of executing the first load instruction and cause the first load instruction to be committed during the commit stage, and, otherwise, discard the optimized execution results and cause the first load instruction to be executed again.

Example 13 includes the substance of the exemplary method of Example 11, wherein each training table entry is further to store an optimization opportunity expiration timeout count, and the processor, when adding a new entry to the training table, is further to set the optimization opportunity expiration timeout count to a fixed number of clocks ahead of a current clock, the processor further to compare the optimization opportunity expiration timeout to the current clock when determining which of one or more entries to evict from the training table.

Example 14 includes the substance of the exemplary method of Example 11, wherein the processor, when setting the state to the first state, uses a move elimination operation by storing the predicted data from the training table entry to a SLT register in a register file, and using a pointer to the SLT register as load data for subsequent instances of the first load instruction.

Example 15 includes the substance of the exemplary method of Example 11, wherein adding the new entry reflecting the first load instruction includes setting the address stored in the new entry to a linear address of the first load instruction, setting the predicated data stored in the new entry to the data returned for the first load instruction, setting the state to the second state, and resetting the count of instances with unchanged data.

Example 16 includes the substance of the exemplary method of Example 11, wherein the training table is stored in memory being distinct from the processor register file.

Example 17 includes the substance of the exemplary method of Example 11, wherein the training table includes one of a set-associative memory structure, a fully associative memory structure, and a direct-mapped memory structure.

Example 18 includes the substance of the exemplary method of Example 11, wherein the processor is further to evict a mispredicted entry from the training table, the mispredicted entry being one whose address matches that of the first load instruction, but whose predicted data differs from data returned for the first load instruction.

Example 19 includes the substance of the exemplary method of Example 18, wherein the processor is further to add each mispredicted load to a Bloom filter, and to use the Bloom filter when selecting a training table entry to evict by determining whether a load-to-evict is either possibly in the set or definitely not in the set.

Example 20 includes the substance of the exemplary processor of Example 18, wherein the processor is to implement a lazy eviction scheme by storing, for each of the mispredicted load instructions, a mismatch count to track how many times the mispredicted load has been mispredicted, and to hold off evicting the mispredicted load until its mismatch count surpasses a second threshold.

Example 21 provides an exemplary non-transitory computer-readable medium containing instructions that, when performed by a processor having a pipeline including stages ordered as fetch, allocate, decode, write back, and commit, cause the processor to respond by: storing a first load instruction in a training table including, for each entry, an address, predicted data, a state, and a count of instances of unchanged return data; determining, during one or more of the allocate and decode stages, whether a training table entry having a stored address matching that of a fetched first load instruction exists and has a first state, and, if so, using the data predicted by the entry to optimize execution, and updating the training table during or after the write back stage to: when no match exists, adding a new entry reflecting the first load instruction, when a match exists, but has different predicted data than the data returned for the first load instruction, reset the count and set the state to a second state, and when a matching entry with matching predicted data exists, increment the count and, when the incremented count reaches a first threshold, set the state to the first state.

Example 22 includes the substance of the exemplary non-transitory computer-readable medium of Example 21, wherein, when the predicted data is used to optimize execution during the execute stage, the processor is further to await receipt of actual load data for the first load instruction, confirm whether the actual load data matches the predicted data, when a match is confirmed, accept results of executing the first load instruction and cause the first load instruction to be committed during the commit stage, and, otherwise, discard the optimized execution results and cause the first load instruction to be executed again.

Example 23 includes the substance of the exemplary non-transitory computer-readable medium of Example 21, wherein each training table entry is further to store an optimization opportunity expiration timeout count, and the processor, when adding a new entry to the training table, is further to set the optimization opportunity expiration timeout count to a fixed number of clocks ahead of a current clock, the processor further to compare the optimization opportunity expiration timeout to the current clock when determining which of one or more entries to evict from the training table.

Example 24 includes the substance of the exemplary non-transitory computer-readable medium of Example 21, wherein the processor, when setting the state to the first state, uses a move elimination operation by storing the predicted data from the training table entry to a SLT register in a register file, and using a pointer to the SLT register as load data for subsequent instances of the first load instruction.

Example 25 includes the substance of the exemplary non-transitory computer-readable medium of Example 21, wherein adding the new entry reflecting the first load instruction includes setting the address stored in the new entry to a linear address of the first load instruction, setting the predicated data stored in the new entry to the data returned for the first load instruction, setting the state to the second state, and resetting the count of instances with unchanged data.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
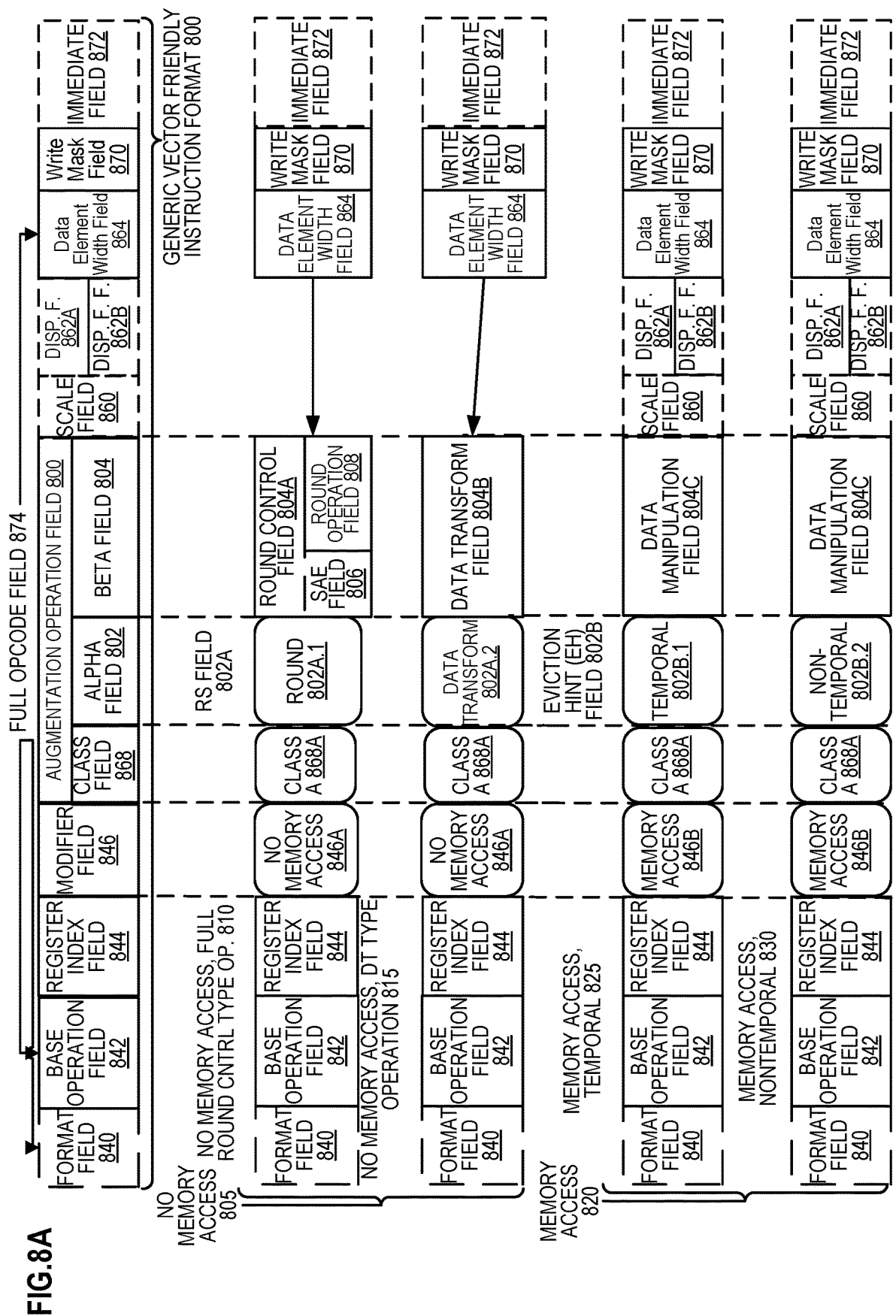
FIGS. 8A-8B are block diagrams illustrating a generic vector friendly instruction format and instruction templates thereof according to some embodiments of the invention.
Figure 8B:
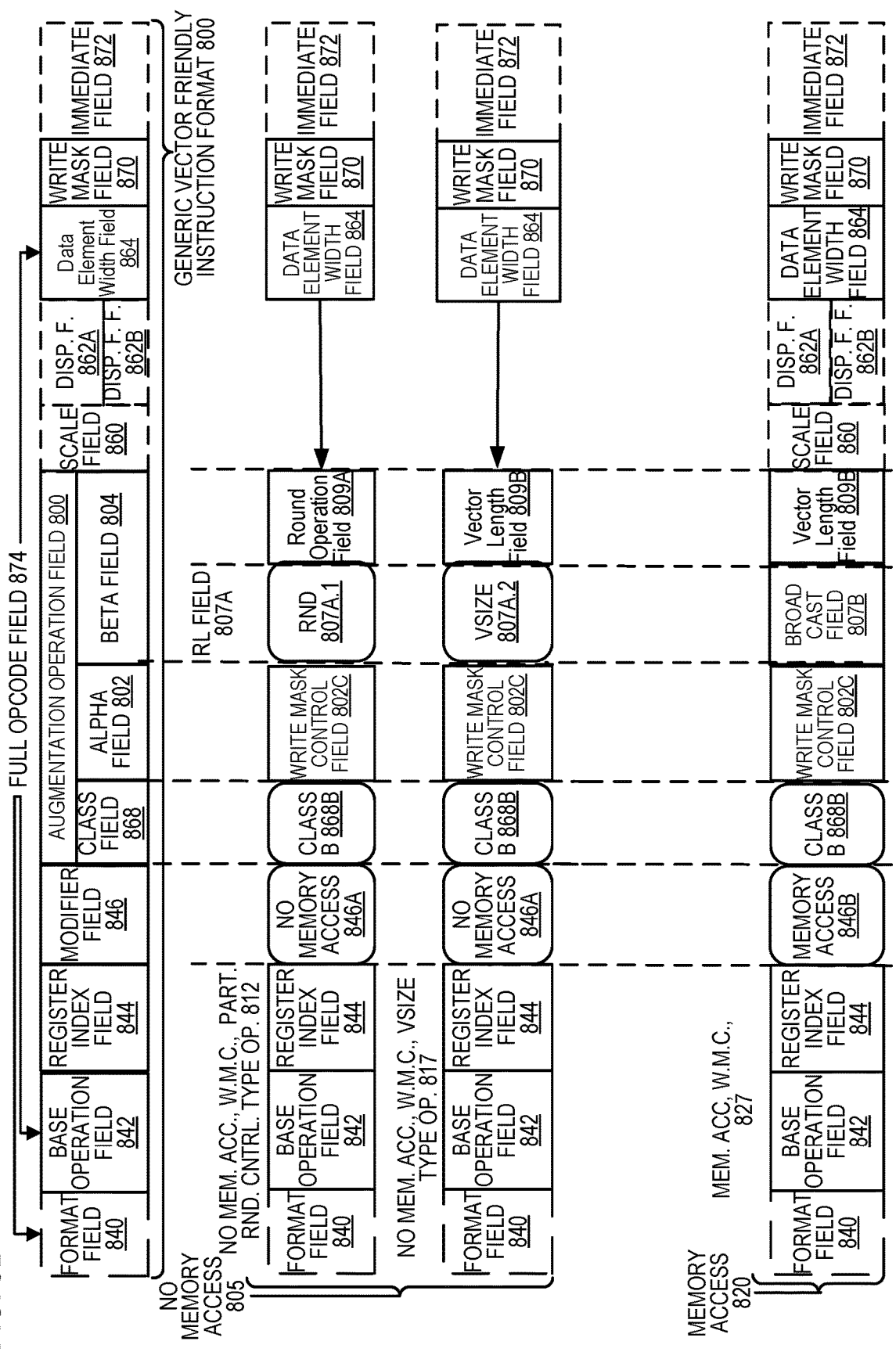

FIGS. 8A-8B are block diagrams illustrating a generic vector friendly instruction format and instruction templates thereof according to some embodiments of the invention. FIG. 8A is a block diagram illustrating a generic vector friendly instruction format and class A instruction templates thereof according to some embodiments of the invention; while FIG. 8B is a block diagram illustrating the generic vector friendly instruction format and class B instruction templates thereof according to some embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In some embodiments, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the invention the round control field 854A includes a suppress all floating-point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating-point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In some embodiments where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates-Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating-point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In some embodiments where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9A is a block diagram illustrating an exemplary specific vector friendly instruction format according to some embodiments of the invention. FIG. 9A shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9A map are illustrated.

It should be understood that, although embodiments of the invention are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one-bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in some embodiments).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]-R), EVEX.X bit field (EVEX byte 1, bit [6]-X), and 857BEX byte 1, bit [5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 910A—this is the first part of the REX' field 910 and is the EVEX.R' bit field (EVEX Byte 1, bit [4]-R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]-mmmm)—its content encodes an implied leading opcode byte (0F, 0F 38, or 0F 3).

Data element width field 864 (EVEX byte 2, bit [7]-W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.v- vvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.0 868 Class field (EVEX byte 2, bit [2]-U)—If EVEX.0=0, it indicates class A or EVEX.U0; if EVEX.0=1, it indicates class B or EVEX.U1.

Prefix encoding field 925 (EVEX byte 2, bits [1:0]-pp)— provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 852 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 854 (EVEX byte 3, bits [6:4]-SSS, also known as EVEX.$s_{2-0}$, EVEX.$r_{2-0}$, EVEX.rr1, EVEX.LL0, EVEX-.LLB; also illustrated with βββ)—as previously described, this field is context specific.

REX' 910B—this is the remainder of the REX' field 910 and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand or be treated as an opcode extension and not used to encode any instruction operand. The role of R/M field 946 may include the following: encoding the instruction operand that references a memory address or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64-byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to some embodiments. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to some embodiments. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
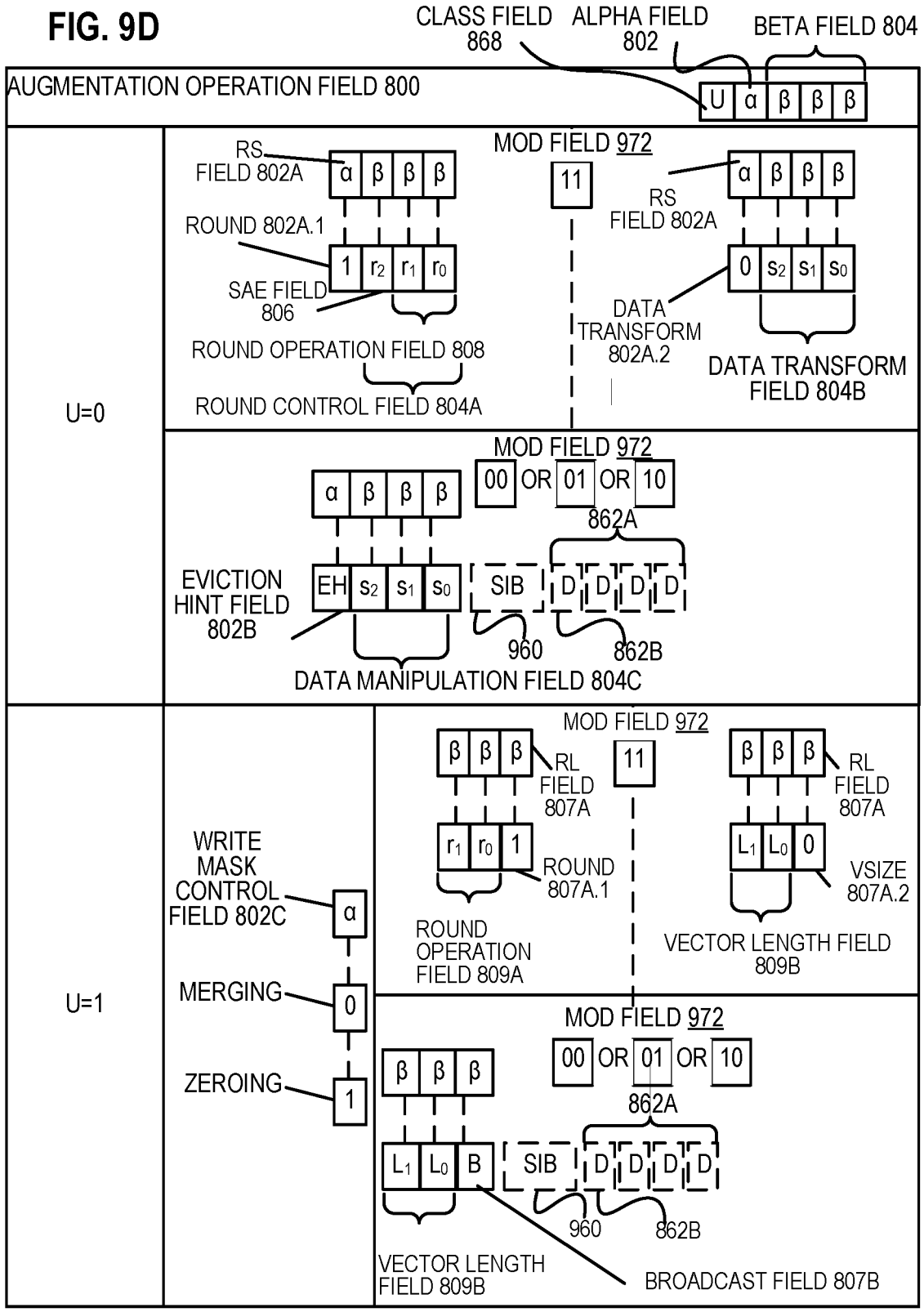
FIG. 9D is a block diagram illustrating the fields of the specific vector friendly instruction format that make up the augmentation operation field according to one embodiment.

FIG. 9D is a block diagram illustrating the fields of the specific vector friendly instruction format 900 that make up the augmentation operation field 850 according to some embodiments. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]-EH) is interpreted as the rs field 852A. When the rs field 852A contains a 1 (round 852A.1), the beta field 854 (EVEX byte 3, bits [6:4]-SSS) is interpreted as the round control field 854A. The round control field 854A includes a one-bit SAE field 856 and a two-bit round operation field 858. When the rs field 852A contains a 0 (data transform 852A.2), the beta field 854 (EVEX byte 3, bits [6:4]-SSS) is interpreted as a three-bit data transform field 854B. When U=0 and the MOD field 942 contains 00, 01, or 10 (signifying a memory access operation), the alpha field 852 (EVEX byte 3, bit [7]-EH) is interpreted as the eviction hint (EH) field 852B and the beta field 854 (EVEX byte 3, bits [6:4]-SSS) is interpreted as a three-bit data manipulation field 854C.

When U=1, the alpha field 852 (EVEX byte 3, bit [7]-EH) is interpreted as the write mask control (Z) field 852C. When U=1 and the MOD field 942 contains 11 (signifying a no memory access operation), part of the beta field 854 (EVEX byte 3, bit [4]-$S_0$) is interpreted as the RL field 857A; when it contains a 1 (round 857A.1) the rest of the beta field 854 (EVEX byte 3, bit [6-5]-$S_{2-1}$) is interpreted as the round operation field 859A, while when the RL field 857A contains a 0 (VSIZE 857.A2) the rest of the beta field 854 (EVEX byte 3, bit [6-5]-$S_{2-1}$) is interpreted as the vector length field 859B (EVEX byte 3, bit [6-5]-$L_{1-0}$). When U=1 and the MOD field 942 contains 00, 01, or 10 (signifying a memory access operation), the beta field 854 (EVEX byte 3, bits [6:4]-SSS) is interpreted as the vector length field 859B (EVEX byte 3, bit [6-5]-$L_{1-0}$) and the broadcast field 857B (EVEX byte 3, bit [4]-B).

Exemplary Register Architecture

Figure 10:
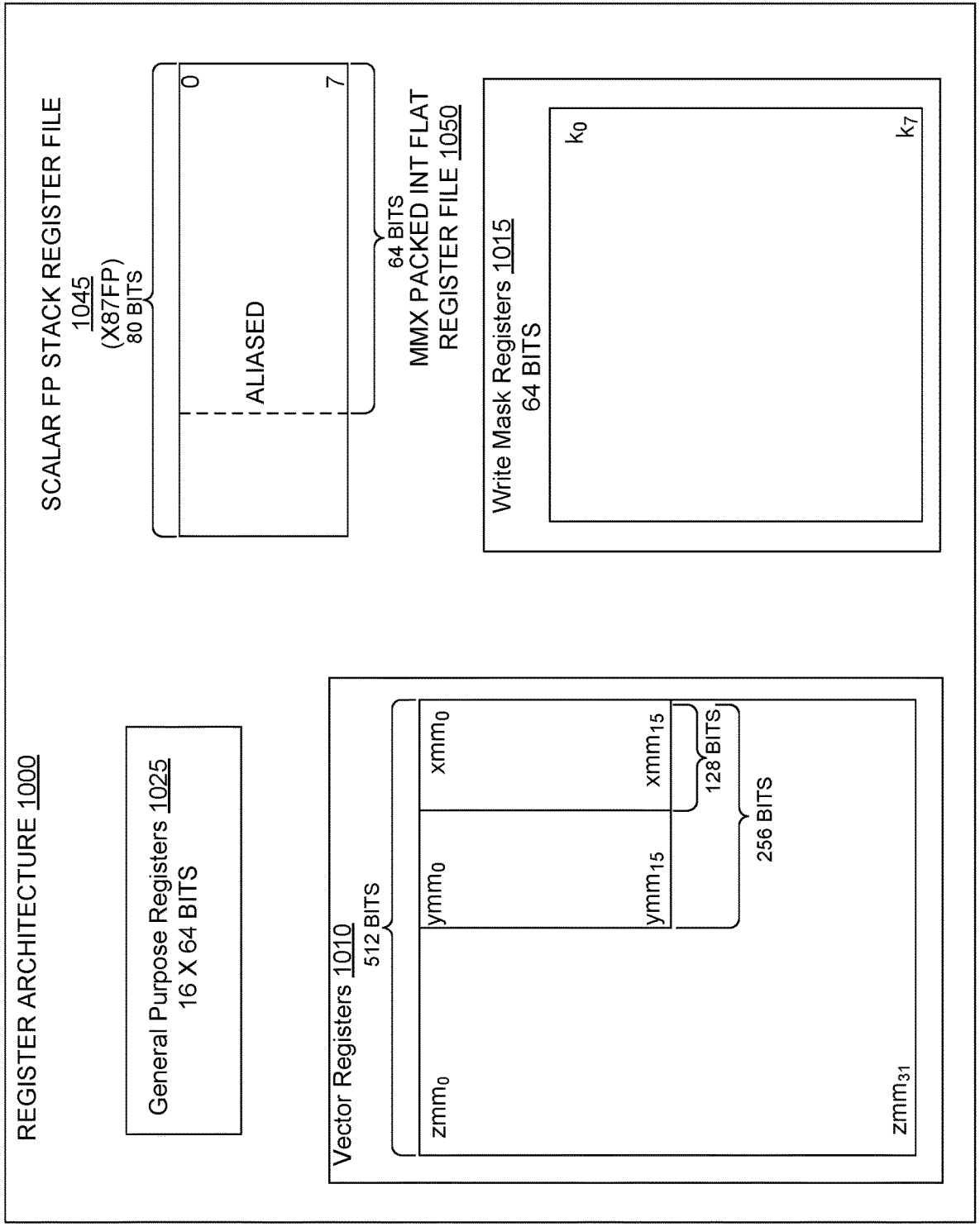
FIG. 10 is a block diagram of a register architecture according to one embodiment.

FIG. 10 is a block diagram of a register architecture 1000 according to some embodiments. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
| --- | --- | --- | --- |
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64-byte, 32-byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram
Specific Exemplary in-Order Core Architecture FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to some embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to some embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
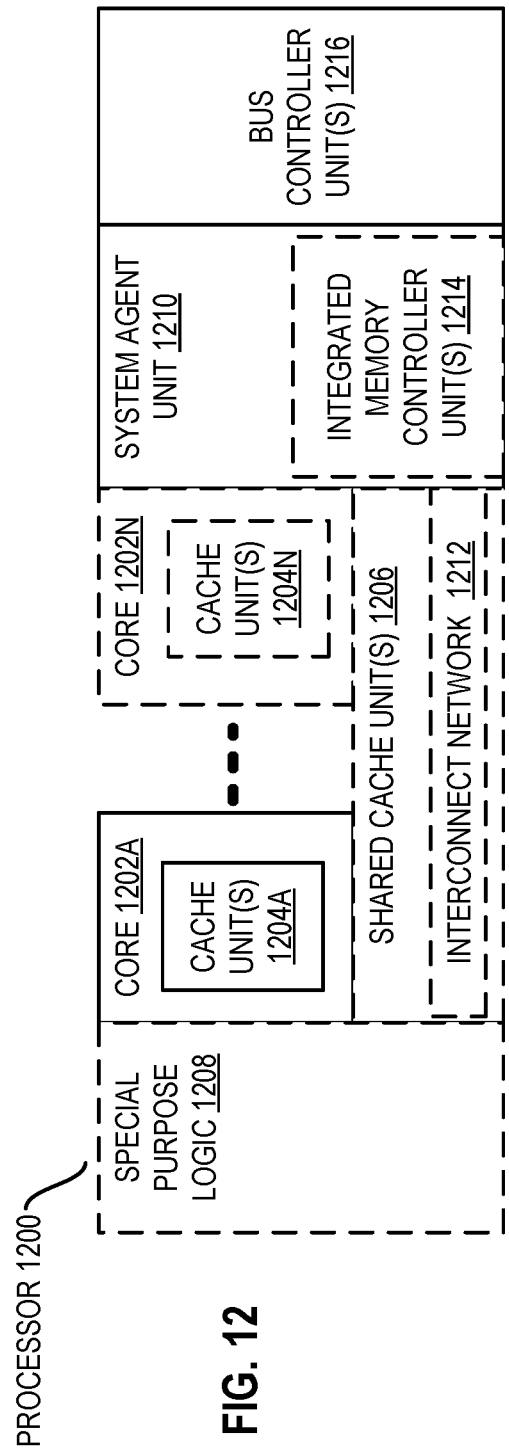
FIG. 12 is a block diagram of a processor that may have more than one core, may have an integrated memory controller, and may have integrated graphics according to some embodiments.

FIG. 12 is a block diagram of a processor 1200 that may have more than one core, may have an integrated memory controller, and may have integrated graphics according to some embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208 (integrated graphics logic 1208 is an example of and is also referred to herein as special purpose logic), the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
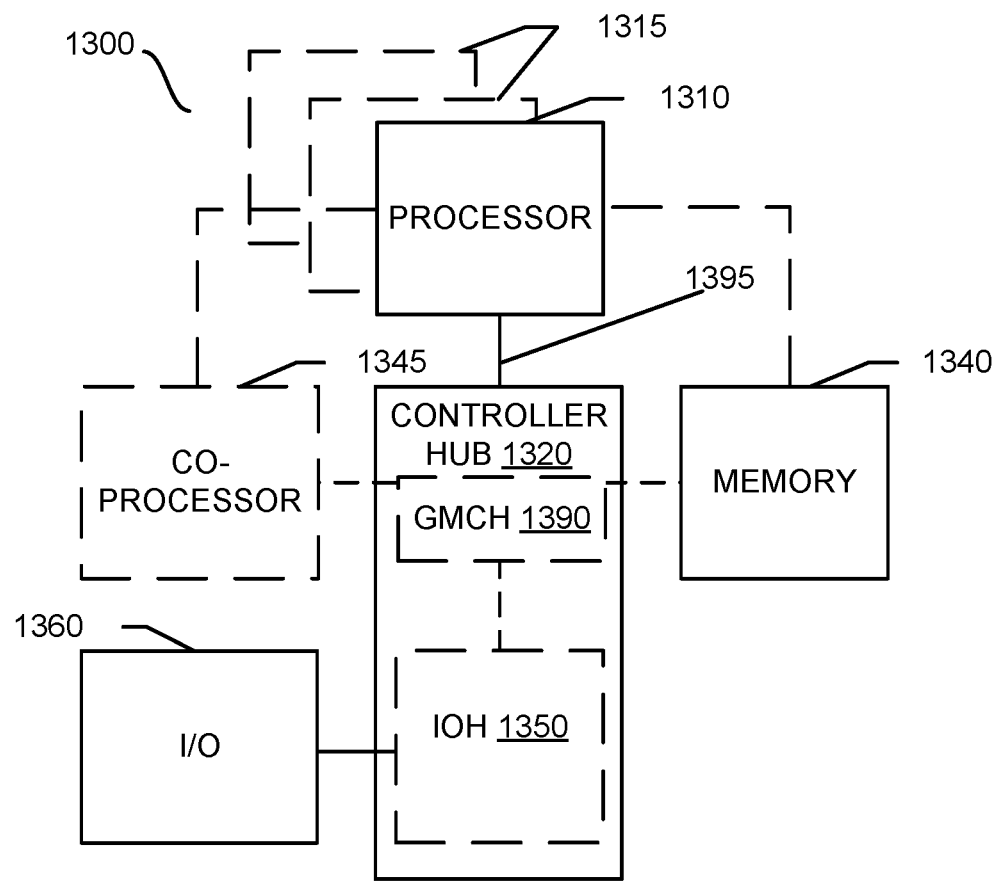
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random-access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
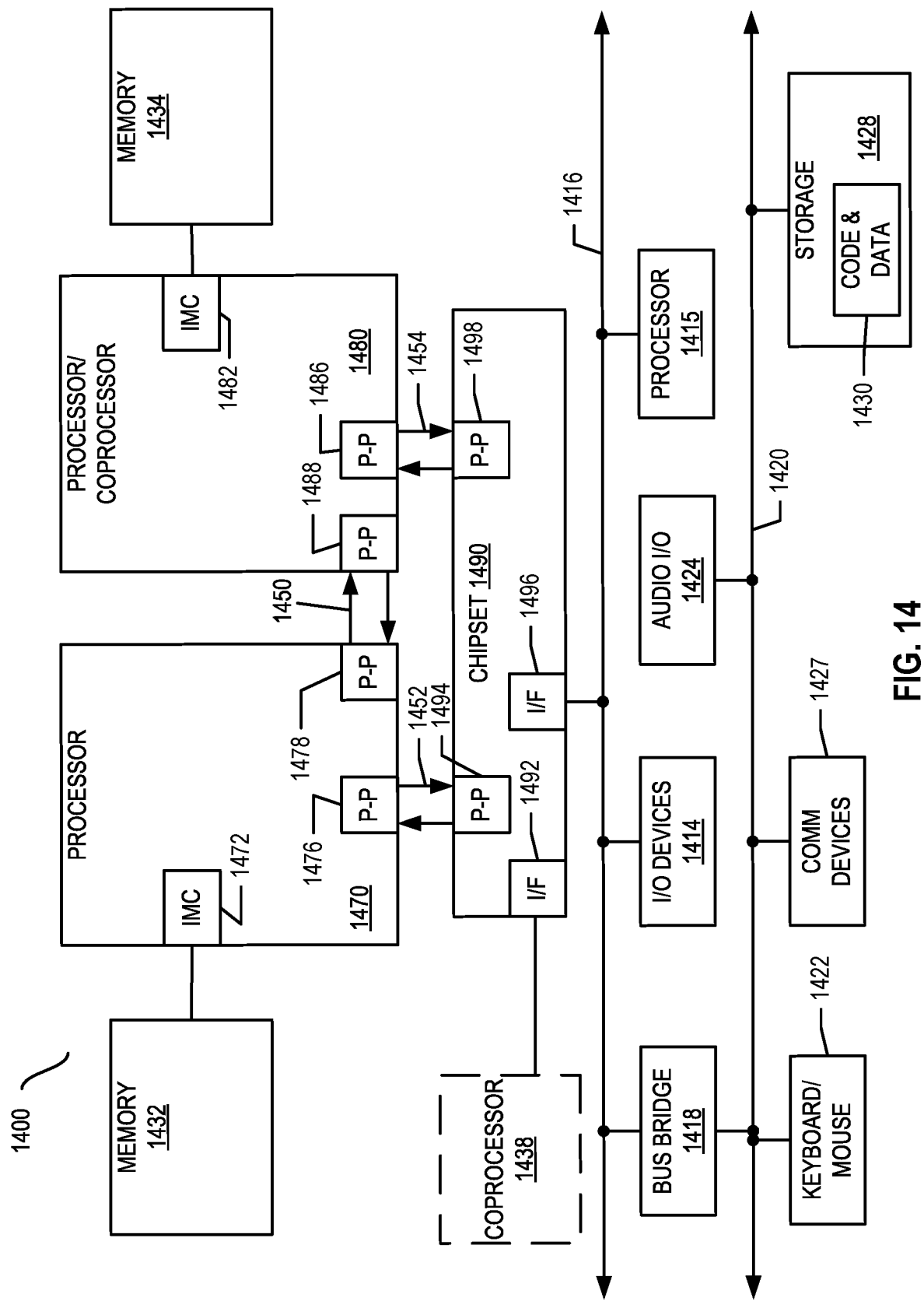

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In some embodiments, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller unit's point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
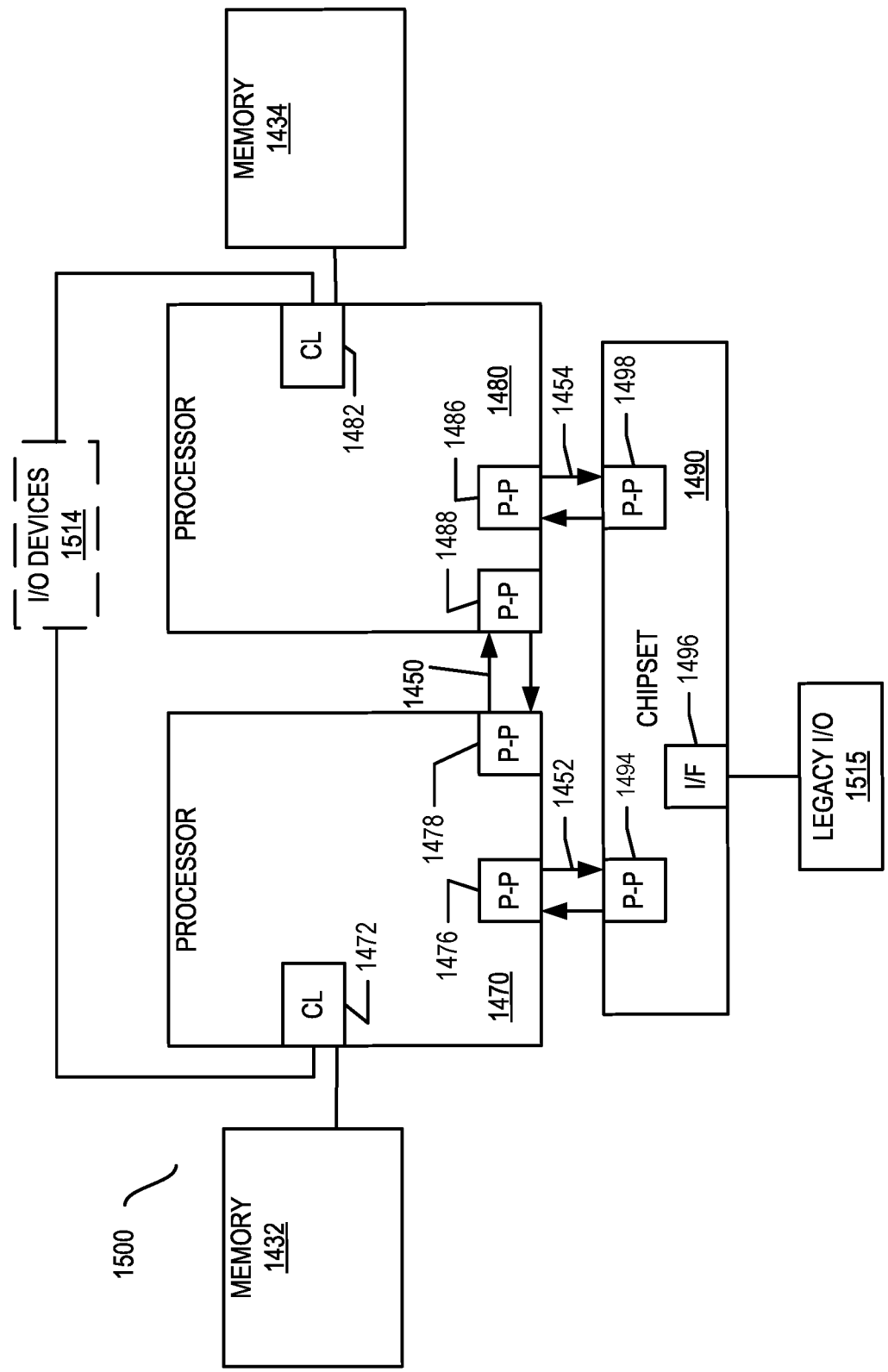

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
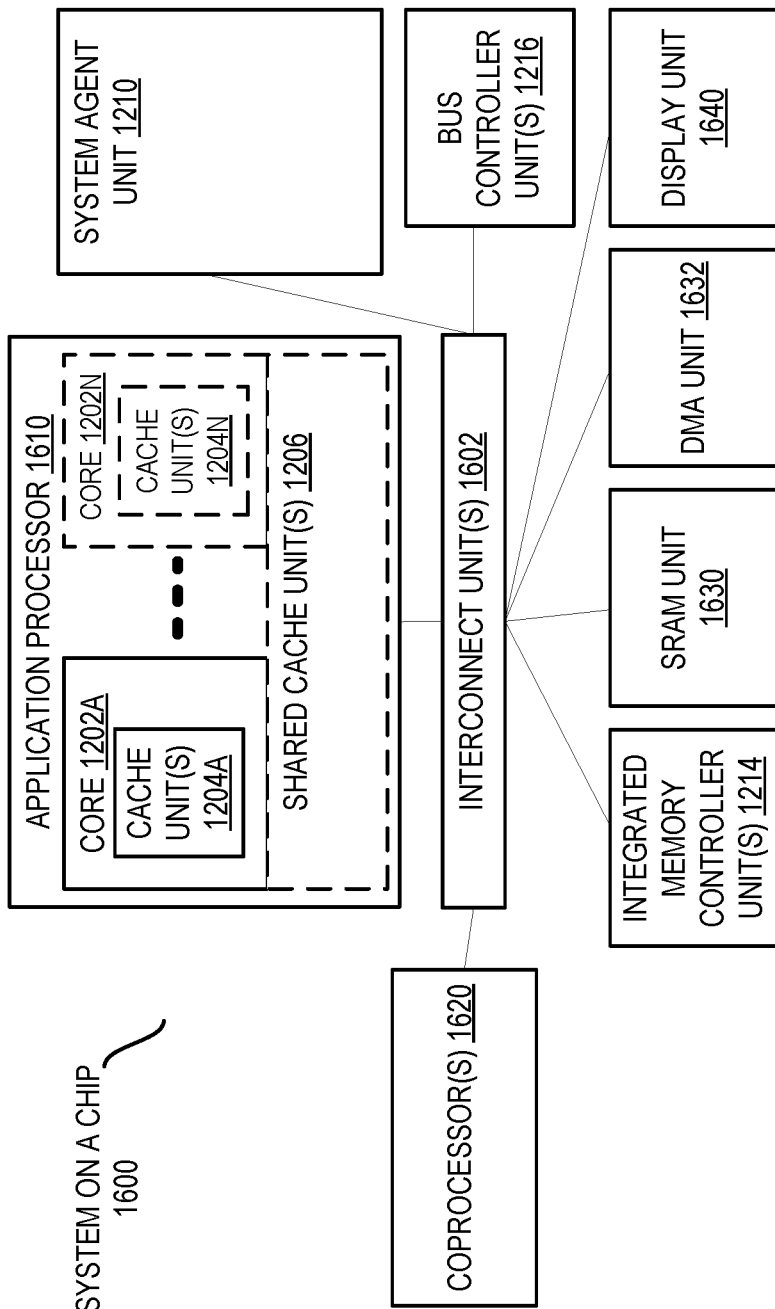

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N, which include cache units 1204A-N, and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
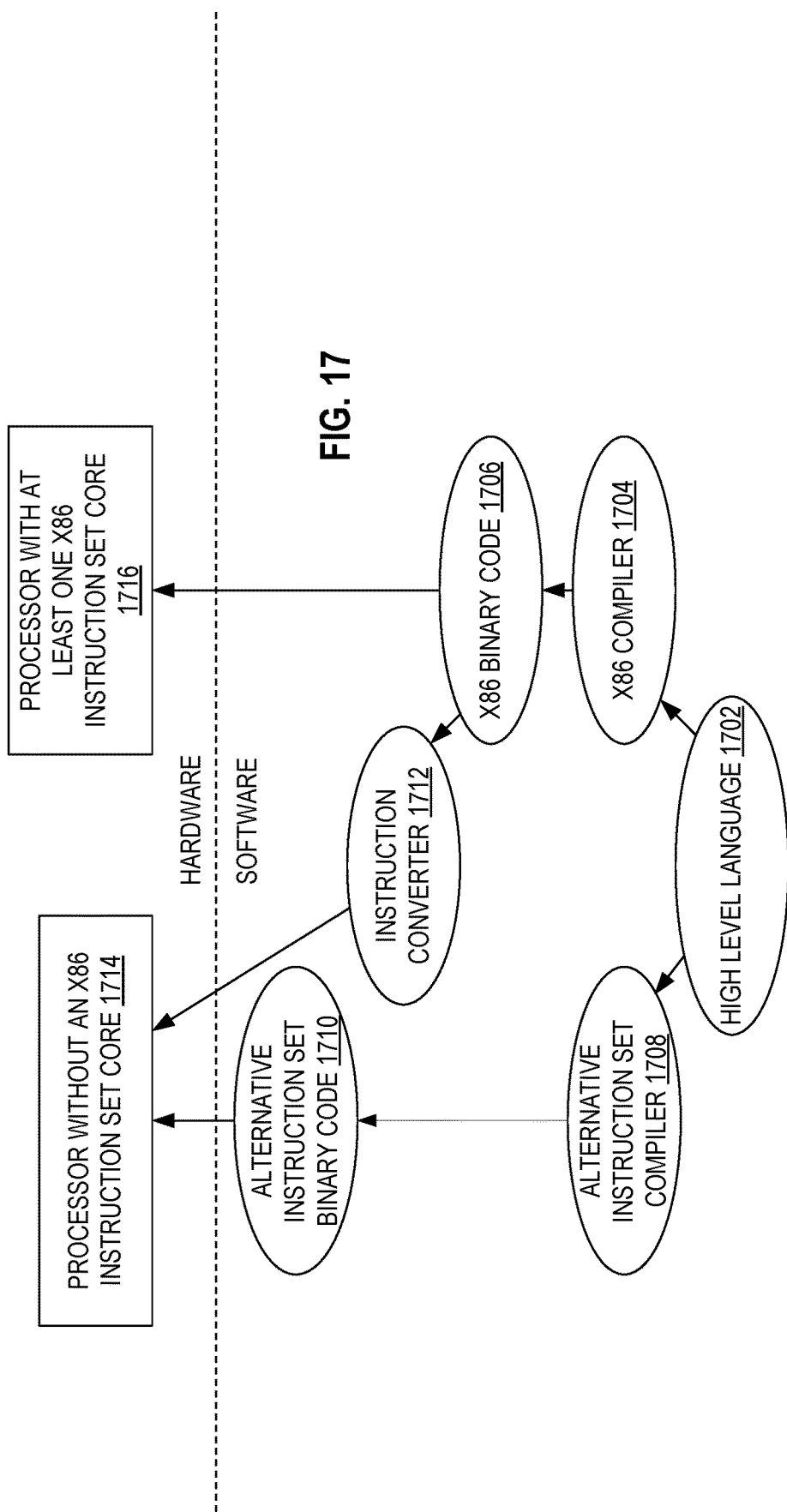
FIG. 17 is a block diagram contrasting the use of a software instruction converter to convert binary instructions in a source instruction set to binary instructions in a target instruction set according to some embodiments.

FIG. 17 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 17 shows a program in a high-level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high-level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

What is claimed is:

1. A processor comprising:
fetch and decode circuitry to fetch and decode load instructions;
a training table to store, for each of a plurality of load instructions, an address, predicted data, a state, and a count of instances of unchanged return data; and
tracking circuitry to determine, during one or more of allocate and decode stages, whether a training table entry has a first state and matches a fetched first load instruction, and, if so, using the data predicted by the entry during an execute stage, the tracking circuitry further to update the training table during or after a write back stage to:
when no match exists, add a new entry reflecting the first load instruction,
when a match exists, but has different predicted data than data returned for the first load instruction, reset the count and set the state to a second state, and
when a match exists with matching predicted data, increment the count and, when the incremented count reaches a first threshold, set the state to the first state.

2. The processor of claim 1, wherein, when the predicted data is used to optimize execution during the execute stage, the processor is further to await receipt of actual load data for the first load instruction, confirm whether the actual load data matches the predicted data, when a match is confirmed, accept results of executing the first load instruction and cause the first load instruction to be committed during a commit stage, and, otherwise, discard the optimized execution results and cause the first load instruction to be executed again.

3. The processor of claim 1, wherein each training table entry is further to store an optimization opportunity expiration timeout count, and the processor, when adding a new entry to the training table, is further to set the optimization opportunity expiration timeout count to a fixed number of clocks ahead of a current clock, the processor further to compare the optimization opportunity expiration timeout to the current clock when determining which of one or more entries to evict from the training table.

4. The processor of claim 1, wherein the processor, when setting the state to the first state, uses a move elimination operation by storing the predicted data from the training table entry to a SLT register in a register file, and using a pointer to the SLT register in a register table, the contents of the SLT register to be used as load data for subsequent instances of the first load instruction.

5. The processor of claim 1, wherein adding the new entry reflecting the first load instruction comprises setting the address stored in the new entry to a linear address of the first load instruction, setting the predicated data stored in the new entry to the data returned for the first load instruction, setting the state to the second state, and resetting the count of instances with unchanged data.

6. The processor of claim 1, wherein the training table is stored in memory being distinct from a register file.

7. The processor of claim 1, wherein the training table comprises one of a set-associative memory structure, a fully associative memory structure, and a direct-mapped memory structure.

8. The processor of claim 1, wherein the processor is further to evict a mispredicted entry from the training table, the mispredicted entry being one whose address matches that of the first load instruction, but whose predicted data differs from data returned for the first load instruction.

9. The processor of claim 8, wherein the processor is further to add each mispredicted load to a Bloom filter, and to use the Bloom filter when selecting a training table entry to evict by determining whether a load-to-evict is either possibly in the set or definitely not in the set.

10. The processor of claim 8, wherein the processor is to implement a lazy eviction scheme by storing, for each of the mispredicted load instructions, a mismatch count to track how many times the mispredicted load has been mispredicted, and to hold off evicting the mispredicted load until its mismatch count surpasses a second threshold.

11. A method comprising:
storing a first load instruction in a training table comprising, for each entry, an address, predicted data, a state, and a count of instances of unchanged return data;
determining, during one or more of allocate and decode stages, whether a training table entry having a stored address matching that of a fetched first load instruction exists and has a first state, and, if so, using the data predicted by the entry to optimize execution; and
updating the training table during or after a write back stage by:
when no match exists, adding a new entry reflecting the first load instruction,
when a match exists, but has different predicted data than data returned for the first load instruction, resetting the count and setting the state to a second state, and
when a match exists with matching predicted data, incrementing the count and, when the incremented count reaches a first threshold, setting the state to the first state.

12. The method of claim 11, wherein, when the predicted data is used to optimize execution during the execute stage, the processor is further to await receipt of actual load data for the first load instruction, confirm whether the actual load data matches the predicted data, when a match is confirmed, accept results of executing the first load instruction and cause the first load instruction to be committed during a commit stage, and, otherwise, discard the optimized execution results and cause the first load instruction to be executed again.

13. The method of claim 11, wherein each training table entry is further to store an optimization opportunity expiration timeout count, and the processor, when adding a new entry to the training table, is further to set the optimization opportunity expiration timeout count to a fixed number of clocks ahead of a current clock, the processor further to compare the optimization opportunity expiration timeout to the current clock when determining which of one or more entries to evict from the training table.

14. The method of claim 11, wherein the processor, when setting the state to the first state, uses a move elimination operation by storing the predicted data from the training table entry to a SLT register in a register file, and using a pointer to the SLT register as load data for subsequent instances of the first load instruction.

15. The method of claim 11, wherein the processor, when setting the state to the first state, uses a move elimination operation by storing the predicted data from the training table entry to a SLT register in a register file, and using a pointer to the SLT register in a register table, the contents of the SLT register to be used as load data for subsequent instances of the first load instruction.

16. The method of claim 11, wherein the training table is stored in memory being distinct from a register file.

17. The method of claim 11, wherein the training table comprises one of a set-associative memory structure, a fully associative memory structure, and a direct-mapped memory structure.

18. The method of claim 11, wherein the processor is further to evict a mispredicted entry from the training table, the mispredicted entry being one whose address matches that of the first load instruction, but whose predicted data differs from data returned for the first load instruction.

19. The method of claim 18, wherein the processor is further to add each mispredicted load to a Bloom filter, and to use the Bloom filter when selecting a training table entry to evict by determining whether a load-to-evict is either possibly in the set or definitely not in the set.

20. The processor of claim 18, wherein the processor is to implement a lazy eviction scheme by storing, for each of the mispredicted load instructions, a mismatch count to track how many times the mispredicted load has been mispredicted, and to hold off evicting the mispredicted load until its mismatch count surpasses a second threshold.

21. A non-transitory computer-readable medium containing instructions that, when performed by a processor having a pipeline comprising fetch, allocate, decode, write back, and commit stages, are to cause the processor to respond by:
storing a first load instruction in a training table comprising, for each entry, an address, predicted data, a state, and a count of instances of unchanged return data;
determining, during one or more of the allocate and decode stages, whether a training table entry having a stored address matching that of a fetched first load instruction exists and has a first state, and, if so, using the data predicted by the entry to optimize execution; and
updating the training table during or after the write back stage by:
when no match exists, adding a new entry reflecting the first load instruction,
when a match exists, but has different predicted data than data returned for the first load instruction, resetting the count and setting the state to a second state, and
when a match exists with matching predicted data, incrementing the count and, when the incremented count reaches a first threshold, setting the state to the first state.

22. The non-transitory computer-readable medium of claim 21, wherein, when the predicted data is used to optimize execution during the execute stage, the processor is further to await receipt of actual load data for the first load instruction, confirm whether the actual load data matches the predicted data, when a match is confirmed, accept results of executing the first load instruction and cause the first load instruction to be committed during a commit stage, and, otherwise, discard the optimized execution results and cause the first load instruction to be executed again.

23. The non-transitory computer-readable medium of claim 21, wherein each training table entry is further to store an optimization opportunity expiration timeout count, and the processor, when adding a new entry to the training table, is further to set the optimization opportunity expiration timeout count to a fixed number of clocks ahead of a current clock, the processor further to compare the optimization opportunity expiration timeout to the current clock when determining which of one or more entries to evict from the training table.

24. The non-transitory computer-readable medium of claim 21, wherein the processor, when setting the state to the first state, uses a move elimination operation by storing the predicted data from the training table entry to a SLT register in a register file, and using a pointer to the SLT register as load data for subsequent instances of the first load instruction.

25. The non-transitory computer-readable medium of claim 21, wherein adding the new entry reflecting the first load instruction comprises setting the address stored in the new entry to a linear address of the first load instruction, setting the predicated data stored in the new entry to the data returned for the first load instruction, setting the state to the second state, and resetting the count of instances with unchanged data.

* * * * *